(12) United States Patent
Cox

(10) Patent No.: US 6,349,393 B1
(45) Date of Patent: Feb. 19, 2002

(54) METHOD AND APPARATUS FOR TRAINING AN AUTOMATED SOFTWARE TEST

(75) Inventor: Robert Charles Cox, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/240,923

(22) Filed: Jan. 29, 1999

(51) Int. Cl.[7] .............................. G06F 11/00; G06F 9/45
(52) U.S. Cl. ............................ 714/38; 714/25; 703/22; 717/1
(58) Field of Search ........................ 714/2, 20, 33, 714/38, 37, 45, 723, 25; 717/4; 703/22; 702/123; 707/1, 101

(56) References Cited

U.S. PATENT DOCUMENTS 5,490,249 A * 2/1996 Miller
5,544,308 A * 8/1996 Giordano et al.
5,892,947 A * 4/1999 DeLong et al.
5,913,023 A * 6/1999 Szermer
6,148,277 A * 11/2000 Asava et al.

* cited by examiner

Primary Examiner—Gopal C. Ray
(74) Attorney, Agent, or Firm—Richard A. Henkler; Leslie A. Van Leeuwen; Bracewell & Patterson, L.L.P.

(57) ABSTRACT

An automated software test is provided which includes a functional model of a system to be tested. The automated software test is utilized to operate a system under test in accordance with specified facts, goals and rules. Quasi-random actions are taken within the system in accordance with specified rules and facts until a defined goal has been accomplished. Training the automated software test is accomplished by specifying a particular goal, i.e. identifying a particularly known defect, and thereafter running the test in a quasi-random fashion until the particular goal has been achieved. The number and nature of actions required to achieve that goal are logged and the process is then repeated until the shortest path required to achieve that goal has been determined. The log of actions which eventually reach a particularly defect may also be utilized a probable cause tree structure for future analysis.

15 Claims, 20 Drawing Sheets

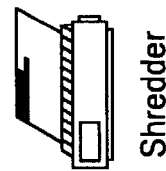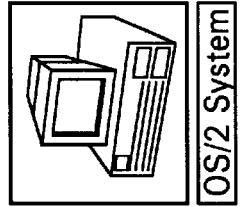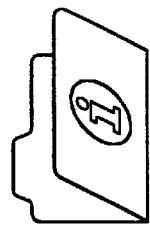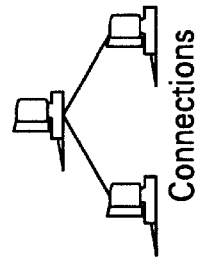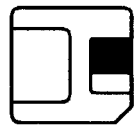
Fig. 2

METHOD AND APPARATUS FOR TRAINING AN AUTOMATED SOFTWARE TEST

CROSS REFERENCE TO RELATED APPLICATIONS

The present application is related to U.S. application Ser. No. 09/210,209, Attorney Docket No. AT9-98-418, filed Dec. 10, 1998, by the inventor herein named and assigned to the assignee herein named.

COPYRIGHT RESERVATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates in general to an approved software test and in particular to an improved automated software test. Still more particularly, the present invention relates to a method and system for efficiently training an automated software test.

BACKGROUND OF RELATED ART

The present invention involves a method and apparatus for training an automated software test. Automated software testing can be defined as a program that automatically enters a predetermined set of characters or user commands in order to test new or modified versions of software applications. software automation test case testing tools. One of the key issues is the use of parameters by automation tools. Parameters must be known in advance. As the number of parameters increase, the sheer numbers limit what can reasonably be tested.

If test tools can support differing languages, each test tool must have a unique set of parameters. If parameters change from one version of the test tool to another, each different set of parameters requires modification to the system under test and/or the test tool's parameter handling.

Another key issue is that automated tests are likely to be static (i.e. they are primarily derived from manual test scripts). Therefore, to test new or changed functions, the test case must be revised. This is also true if a new or changed parameter is added or revised. This results in high maintenance.

Yet another key issue is that the function to be tested must exist in some detail for automated test cases to be written. The implication of this is that it is difficult to debug an incomplete function. The coding of the test cases delay the ultimate execution and completion of the testing. In addition, when a new defect is accidentally found outside the testing space, a new test case is required.

The present invention will be better understood and its numerous objects and advantages will become more apparent to those skilled in the art by reference to the following drawings, in conjunction with the accompanying specification.

Currently, it is almost an impossible task to test all the various combinations of parameters within a reasonable time frame. From a mathematical point of view, it is believed to be a solvable problem; however, it would take an almost infinite length of time to solve, and even if one does not need to test parameters, one must test the parameters them because today's tools need parameters to work.

Current automated test cases are acceptable for regression testing, but are considered unacceptable for non-regression testing (e.g. development systems). The maintenance, as noted, is too high. One changed parameter and the test case must be revised. If the vendor changes the tool, it is likely that the test case must be revised. The maintenance of test cases on a developing system is very high. The user must know what all the parameters are and the function they support before they can begin coding the test case.

The automated software test set forth in the co-pending, cross-referenced application provides a novel quasi-random automated software test; however, it would be desirable to be able to train such a quasi-random automated software test to efficiently find known defects or perform any regression test, as disclosed in the present application.

SUMMARY OF THE PRESENT INVENTION

It is therefore one object of the present invention to provide an improved software test.

It is another object of the present invention to provide an improved or automated software test.

It is yet another object of the present invention to provide an improved method and system for efficiently training an automated software test.

The foregoing objects are achieved as is now described. An automated software test is provided which includes a functional model of a system to be tested. The automated software test is utilized to operate a system under test in accordance with specified facts, goals and rules. Quasi-random actions are taken within the system in accordance with specified rules and facts until a defined goal has been accomplished. Training the automated software test is accomplished by specifying a particular goal, i.e. identifying a particularly known defect, and thereafter running the test in a quasi-random fashion until the particular goal has been achieved. The number and nature of actions required to achieve that goal are logged and the process is then repeated until the shortest path required to achieve that goal has been determined. The log of actions which eventually reach a particularly defect may also be utilized a probable cause tree structure for future analysis.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 2 shows an empty desktop, or a state of the system when the application is not executing;

DETAILED DESCRIPTION OF THE PREFERRED EMBODIMENT

There are two ways an automated software test can be initiated. First is to take some quasi-random action as defined by the model and then query the result. An alternate way is to first query the system under test. In either case, as soon as the query is completed, a rule engine, whose job it is to modify the behavior of the model, applies rules until either another action can be taken or the test can be completed. The model must run forever if rules do not exist or can never be applied.

This implies that some attainable goal must exist to stop the test. In the case where function is particularly buggy, this should probably be some time limit. Also, goals that are difficult to attain because they represent deep seated or uncommon objectives can be NP-Complete. This is another reason for time limits. However, the problem with deep seated goals can be reduced by the use of sub or interim goals and controlling restart states in the model.

Failures are logged as required. If an "action is taken", it is first checked for exceptions. Exceptions are those things that might destroy future testing, for example, rebooting the machine under test.

Taking quasi-random actions means two things. First, and most important, is that the test can be repeated if necessary, and, second, that the actions can be taken under defined distributions. For example, assume one knows that the average user saves the file ten times for each printing of the file. One can set up a ten to one targeted bin distribution for save versus print; or, one can set up a Gaussian distribution, uniform distribution or whatever is required.

A trace log is created so that history is preserved. It is also created for future enhancements, such as learning the paths to goals, so that future executions in a regression test mode do not have to "guess" their way toward a goal. They can go there directly.

The facts, goals, rules and models are application dependant and would be designed by the Tester. Initialization, actions, queries, exception handling, logging and the rules engines are reusable by the Tester.

Figure 1:
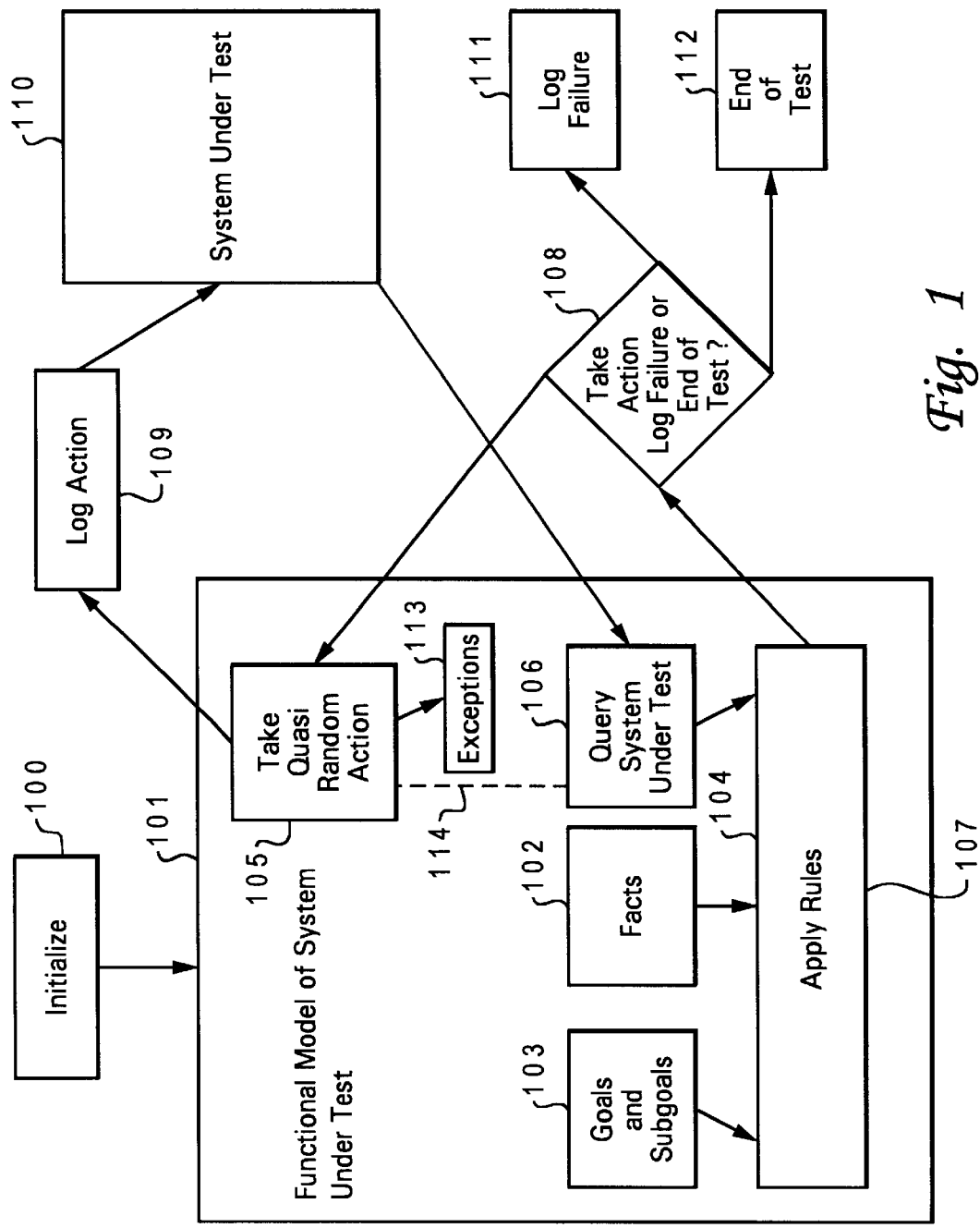
FIG. 1 represents the flow diagram for an automated software test which may be trained in accordance with the present invention.

The Testing system is defined in the flowchart, FIG. 1. It should be noted in the Functional Model of System under Test 101, if one initially ignores the goals and subgoals 103, 102 the facts, 113 the exceptions and 112 end of test, you have a single rule that always passes, and assumes that a failure will never stop the test. The execution of the functional model System under test 107 begins by initializing the test 100. Initializing is doing such things as placing the date and time in logs. Then, depending on the system under test 110 and the model of the system under test 101, the execution can either take some quasi-random action 105 or by querying the system under test 106. The choice will most likely be based on the state of the system under test 110. If the state is known (for example, an unexecuted software application), then the quasi-random action to execute some application 105 would be taken first. However, if the state of the system under test is unknown (for example, beginning a test on an execution LAN system), then the query of the LAN system would be appropriate before taking any quasi-random action 105, so 106 would occur first.

Assume that as an example some quasi-random action 105 is taken first. The next action would be logged 109 and taken on the system under test 110. The action would be something like "press the left mouse button on the 'OK' button in application XYZ" or "stop execution of task X on the XYZ LAN". After the action has taken hold (determined by the model), the model of the system under test 101 would query 106, the system under test 110, through an implied path 114 in the model, to determine the effects of the action. Since the rules always pass 107 and failure never stops, a decision will be made 108 to either log a failure 111 and continue another action, or just continue another action where no failure occurs. The test will run endlessly through the path 105, 109, 110-114, 106, 110, 106, 107, 108, 105, 109, 110- . . . or 106, 110, 106, 107, 108, 105, 109, 110-114, 106, 110, 106, . . . in case the query occurred prior to the action.

If we assume there are actions in a test that the user does not wish to take (for example, actions that are destructive), exception 113 detects such actions as defined by the Tester as a special fact 102 and will purposely fail to execute them each time they occur. Facts 102 are simple declarations such as the name of the button 'OK' or the name of a server on a LAN such as 'ServerOne'. Goals 103 are what the Tester is trying to accomplish (for example, find a button called 'OK', or find a message on the LAN with the text "This is a test"). Once goals 103, facts 102 and the result of a query 106 are available, rules 107 can be made to change the behavior of the model 101. For example, one such rule could be "when a goal 103 is reached, then end the test at 112. At this point, the test will stop executing.

Regarding the dotted line 114 between "Take Quasi-Random Action 105 and "Query System Under Test" 106, the following is noted. Immediately after taking 105, 114 the dotted line begins. Depending on the model 101, the dotted line 114 can take one of three forms. In the first case, immediately query System Under Test 106, in the second case, Query 106 once after some predefined delay, or in the third case, query 106 X number of times with some small delay between queries. The normal expectation is that an action 105, performed on the system under test 110, will cause some change in the state of 110 and the query 106 will detect it. For example, if the left mouse button is down (the action) on the 'File' portion of a word processor's menu bar, after a small period of time one would expect to see a drop-down menu with the selection 'Save' (the result of the query). Normally, if the state of the system under test 110 is unchanged, it indicates a failure. Therefore, the result of the query does not indicate the presence of a drop-down menu with the selection 'Save'.

It cannot be said that it will always be the case that an action is expected to produce some change in state. There are tests where an action is taken and the expectation is that nothing will happen. If something does happen, then it is viewed as a failure. The apply Rules 107 sorts out which query at 106 results in a failure 111 and which does not.

The following "Example" demonstrates how the present invention can be used to test the system.

A. Assumptions:
1. This testing method is used on the application depicted in FIGS. 2 through 13.
2. None of the application's parameters will be used by the Tester in designing the test.
3. The test is to verify that window H functions are required.
4. The Tester is responsible for the following test definition:
   a. the model (FIG. 1 at 101) of the application (FIG. 1 at 110)
   b. the goals or optional subgoals (FIG. 1 at 103)
   c. the facts (FIG. 1 at 102) required, including any exceptions (FIG. 1 at 113)
   d. the rules (FIG. 1 at 107)
5. The application defines the limits of the testing space.
6. The operating system in which the application executes is outside the testing space.
7. The Smart Test software that manipulates the Tester's test is outside the testing space.
8. The quasi-random selections are based on a uniform distribution.

B. Explanation of the applications depicted in FIGS. 2 through 13:

FIG. 2 shows an empty desktop, or a state of the system when the application is not executing.

Figure 3:
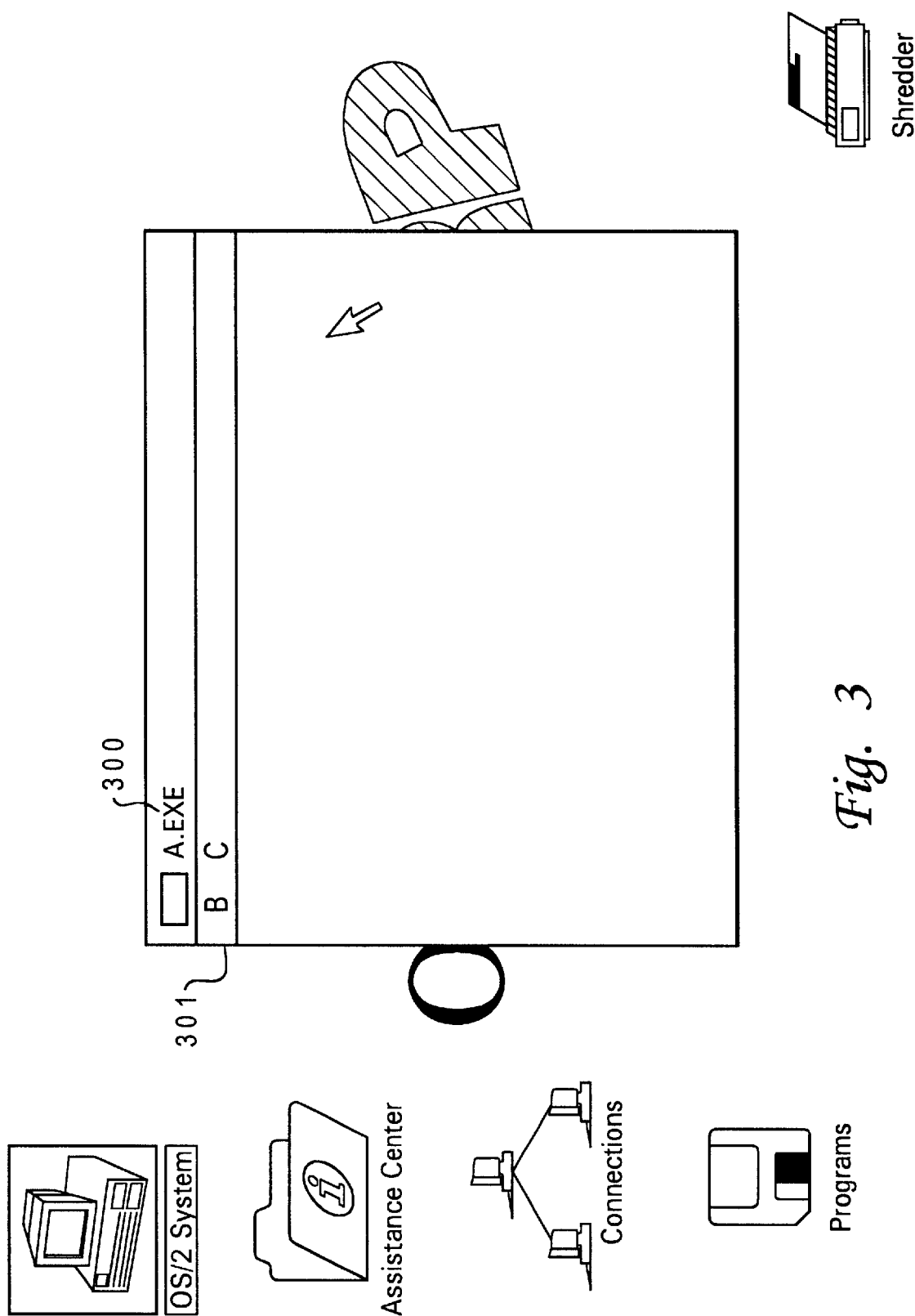
FIG. 3 shows the application after it has been started. Note the window named A and that it has a menu bar with menu items B and C.

FIG. 3 shows the application after it has been started. Note that the window is named A at 300 and that it has a menu bar 301 with menu items B and C.

Figure 4:
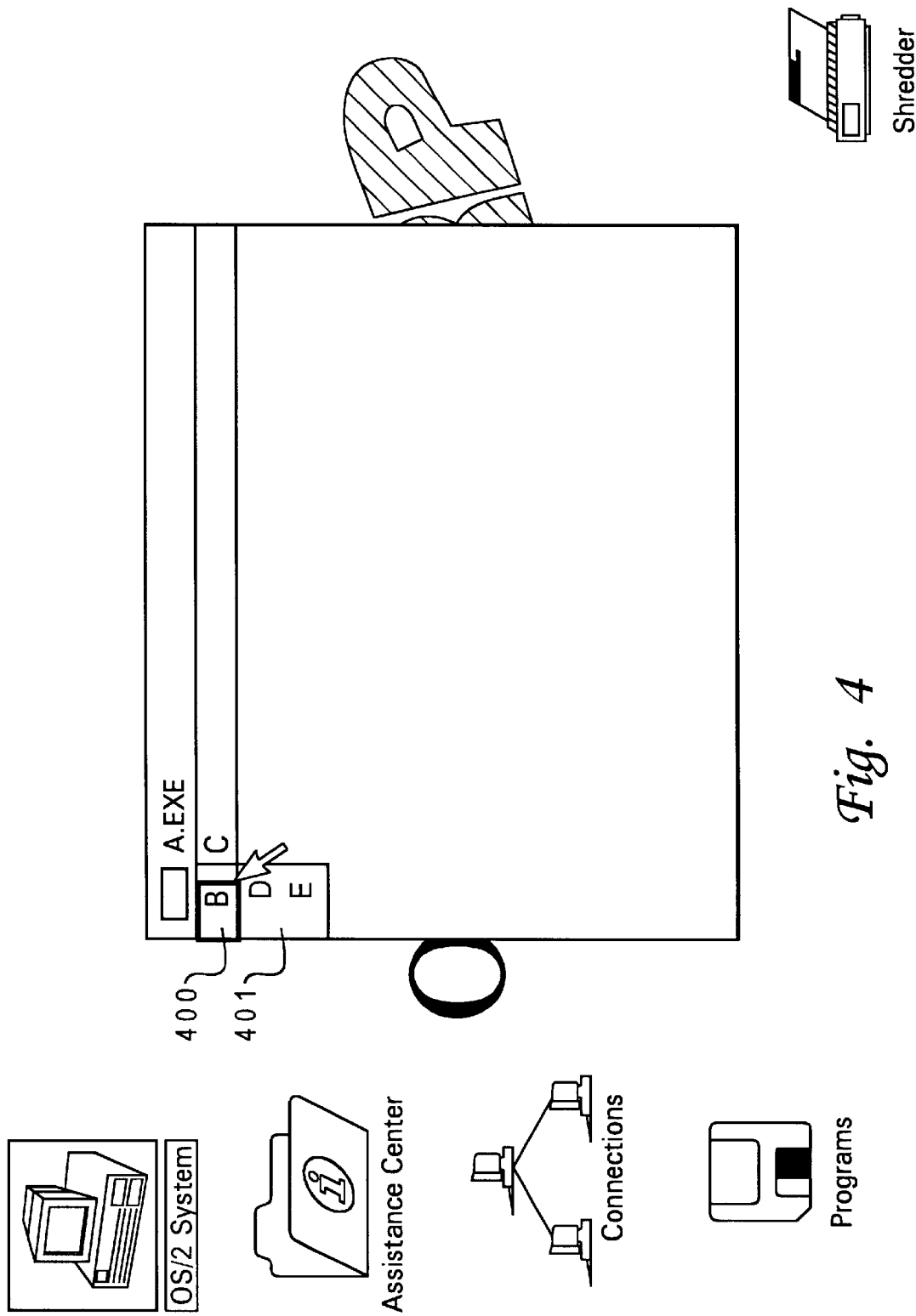
FIG. 4 shows the application when the menu item B is focused. Note the drop-down menu with items D and E.

FIG. 4 shows the application when the menu item B at 400 is focused. Note a drop-down menu 401 with items D and E.

Figure 5:
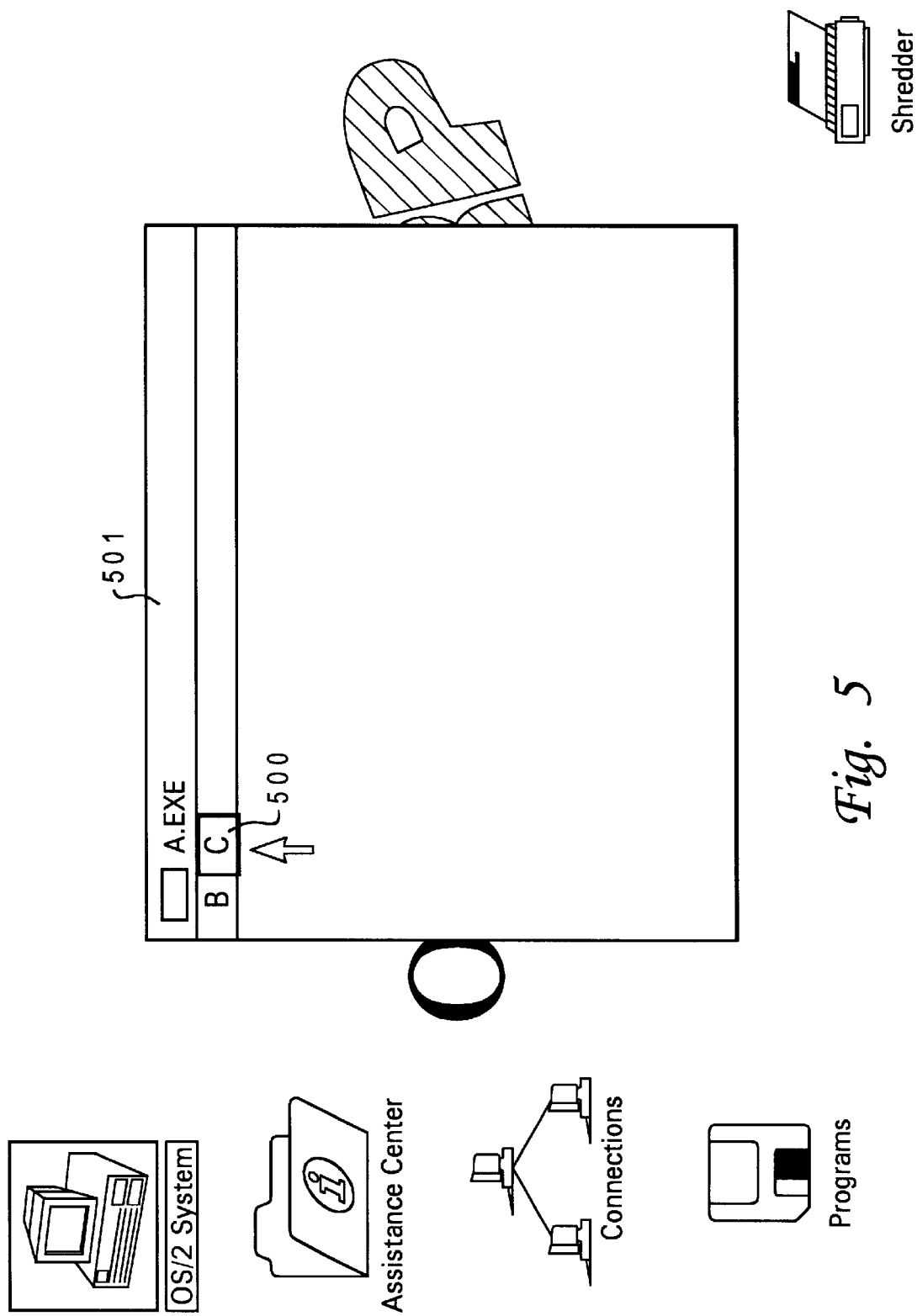
FIG. 5 shows the application when the menu item C is focused. Note the absence of a drop-down menu.

FIG. 5 shows window A at 501 and shows the application when the menu item C at 500 is focused. Note the absence of a drop-down menu.

Figure 6:
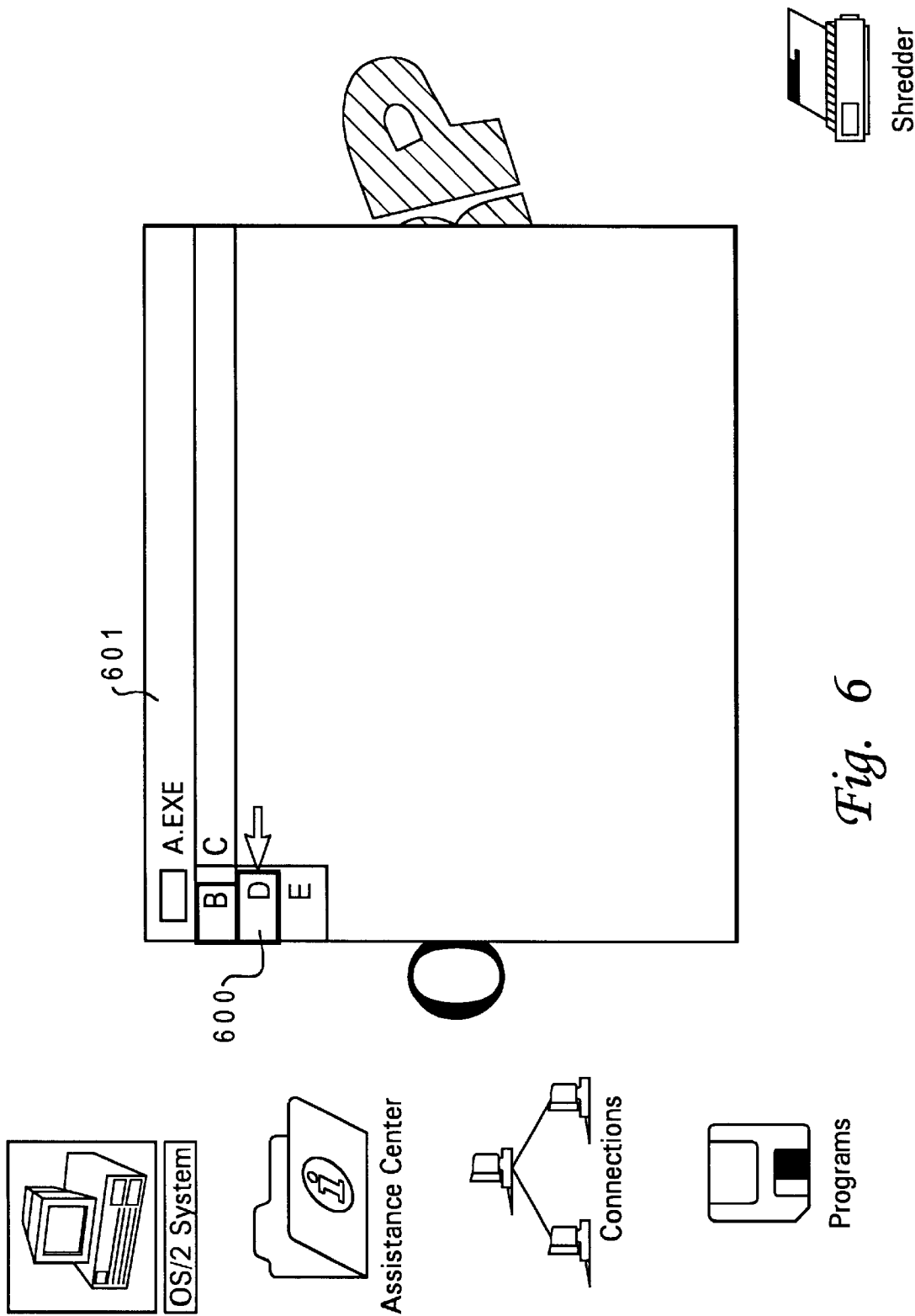
FIG. 6 shows the application when item D is focused. Note the absence of an add on menu.

FIG. 6 shows window A at 601 and shows the application when item D is focused at 600. Note the absence of an add on menu.

Figure 7:
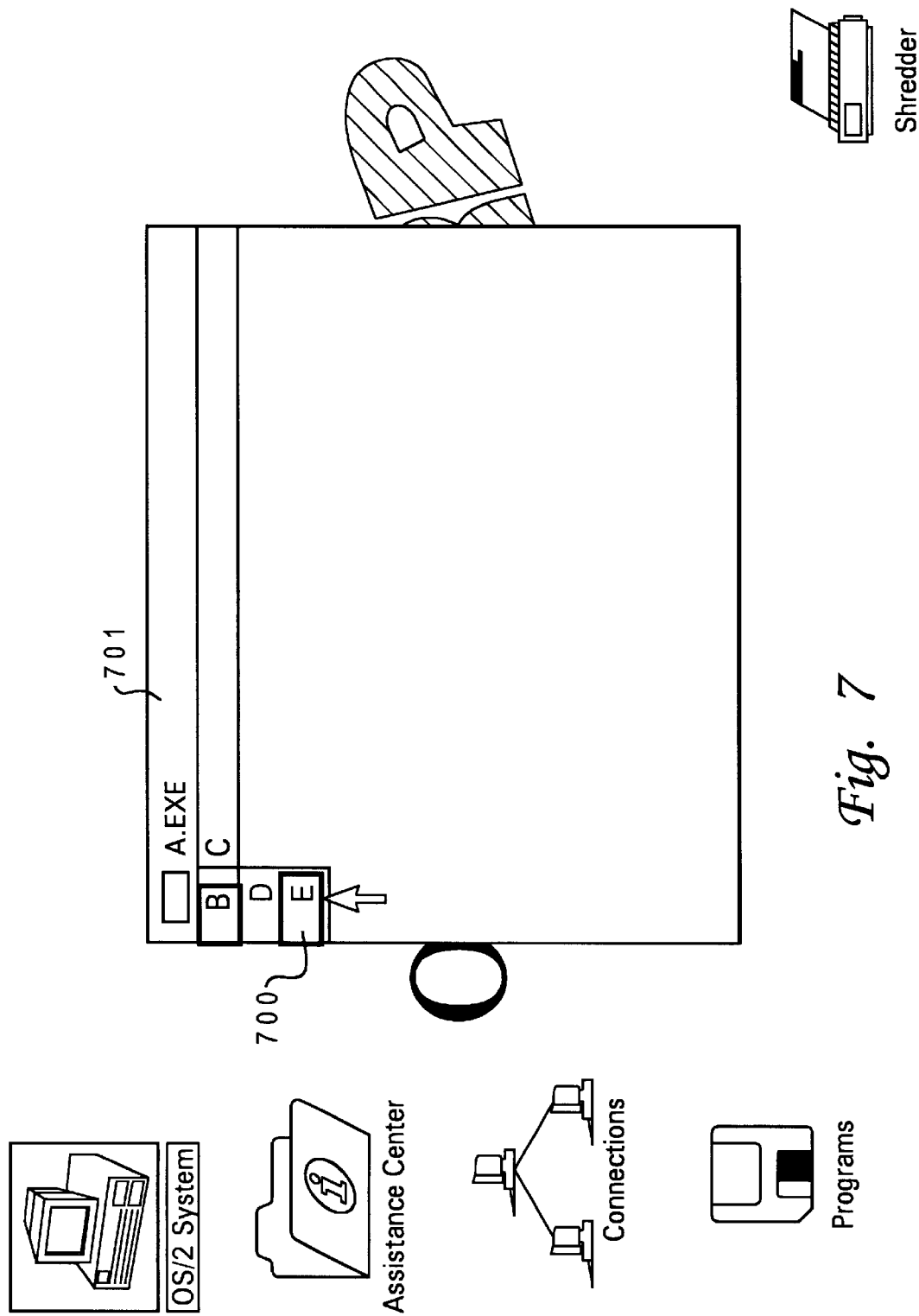
FIG. 7 shows the application when menu item E is focused. Note the absence of an add on menu.

FIG. 7 shows window A at 701 and shows the application when menu item E at 700 is focused. Note the absence of an add on menu.

Figure 8:
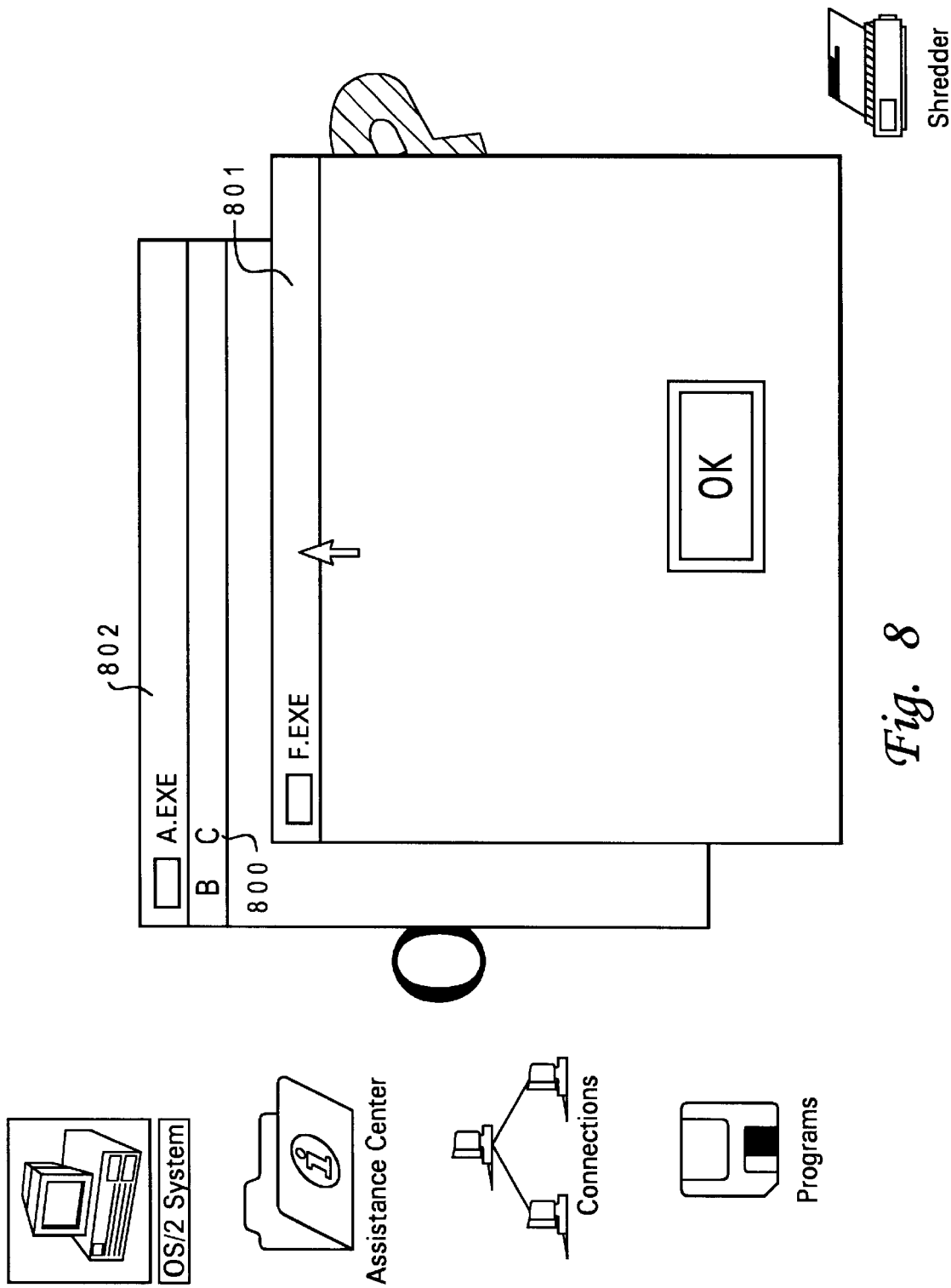
FIG. 8 shows the result of selecting menu item C, window F appears.

FIG. 8 shows window A at 802 and the result of selecting menu item C at 800, window F appears 801.

Figure 10:
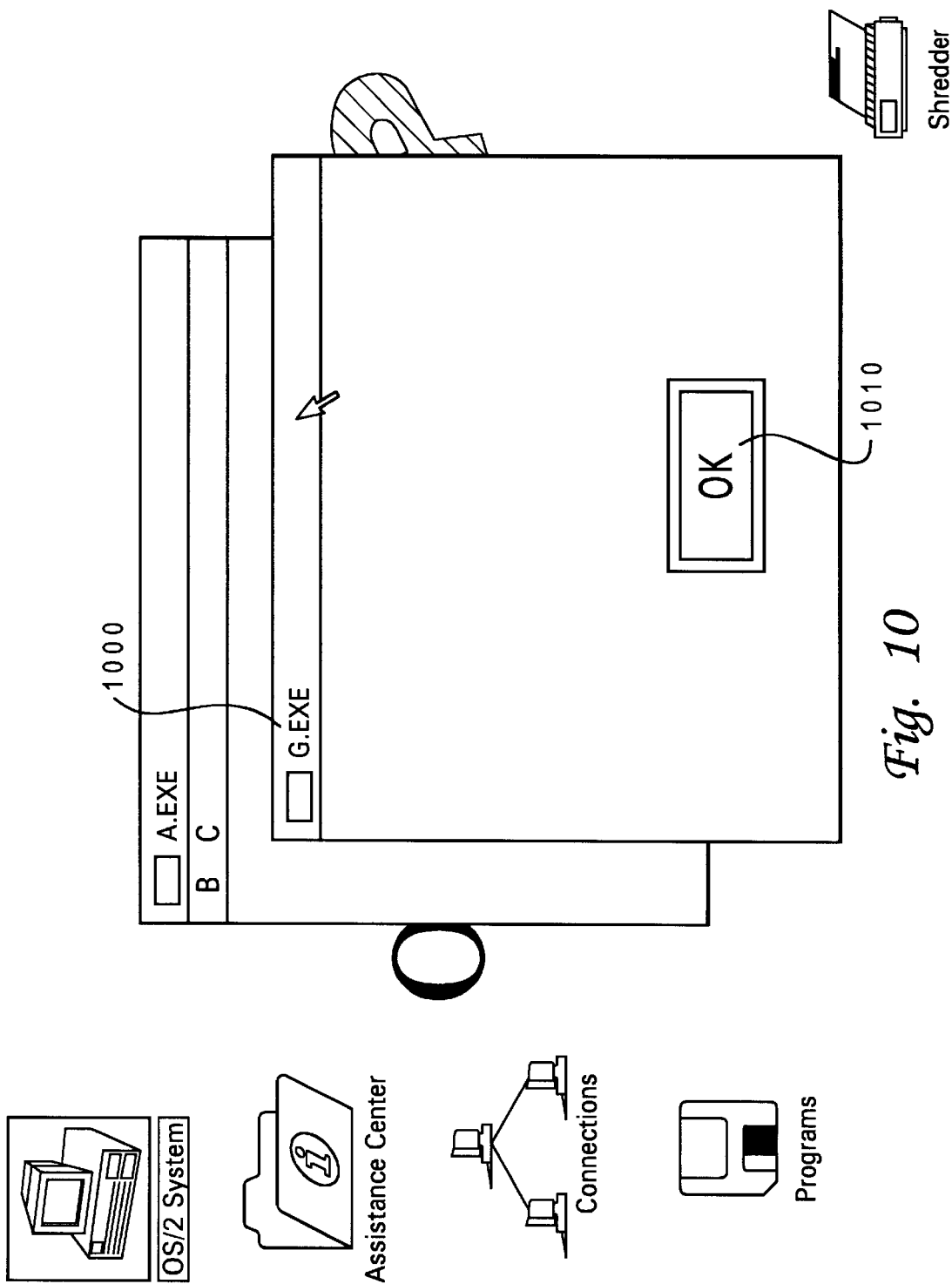
FIG. 10 shows the result of selecting menu item D, window G appears.

FIG. 10 shows the result of selecting menu item D. window G appears at 1000.

Figure 12:
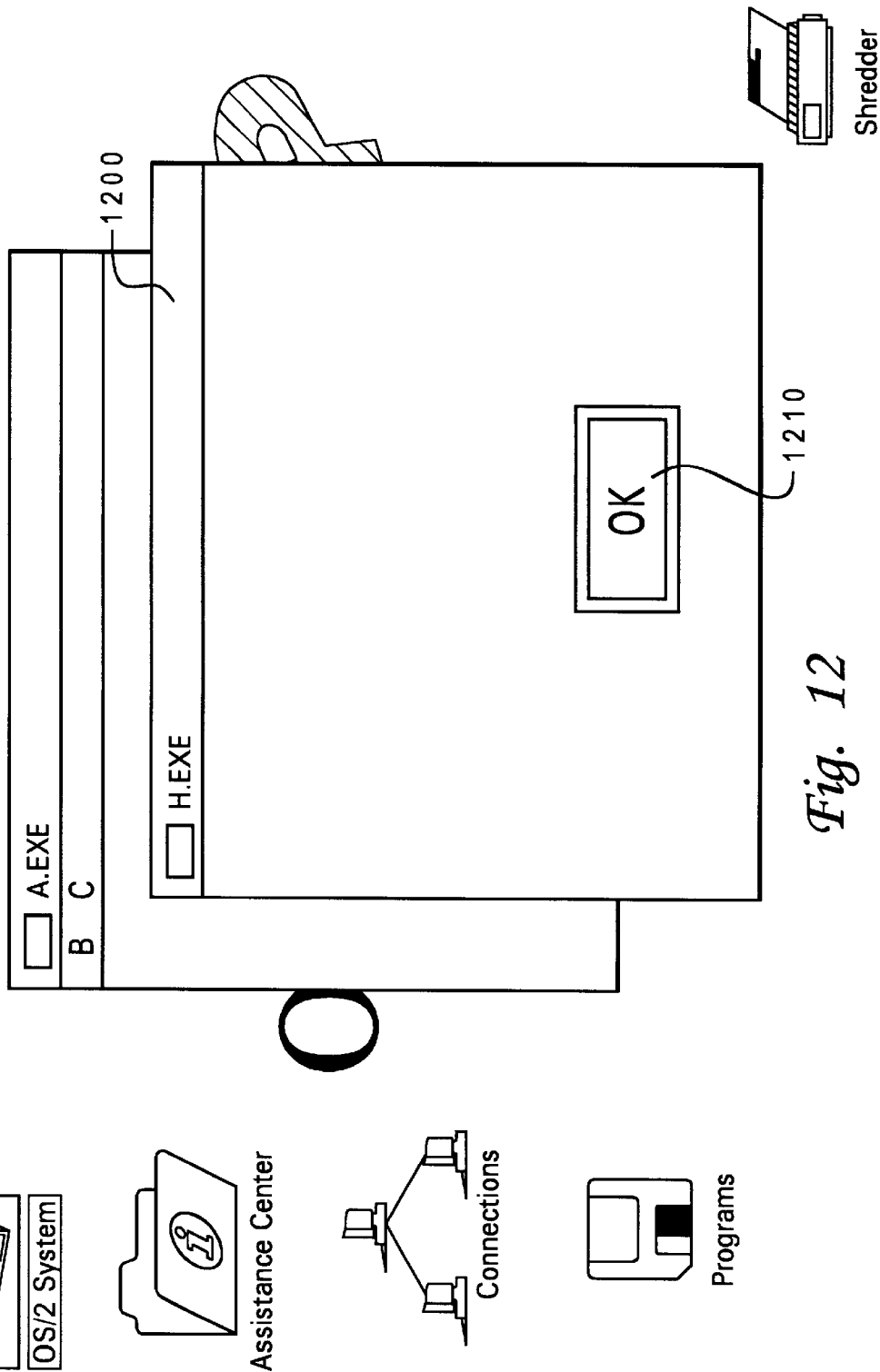
FIG. 12 shows the result of selecting menu item D, window H appears. Windows F, G and H will remain on the desktop until their respective "OK" buttons are selected. When the "OK" button is selected, the suitable window will disappear.

FIG. 12 shows the result of selecting menu item D, window H appears at 1200 and the "OK" button at 1210. Windows F, G and H will remain on the desktop until their respective "OK" button is selected. When the "OK" button is selected, the suitable window will disappear.

Figure 9:
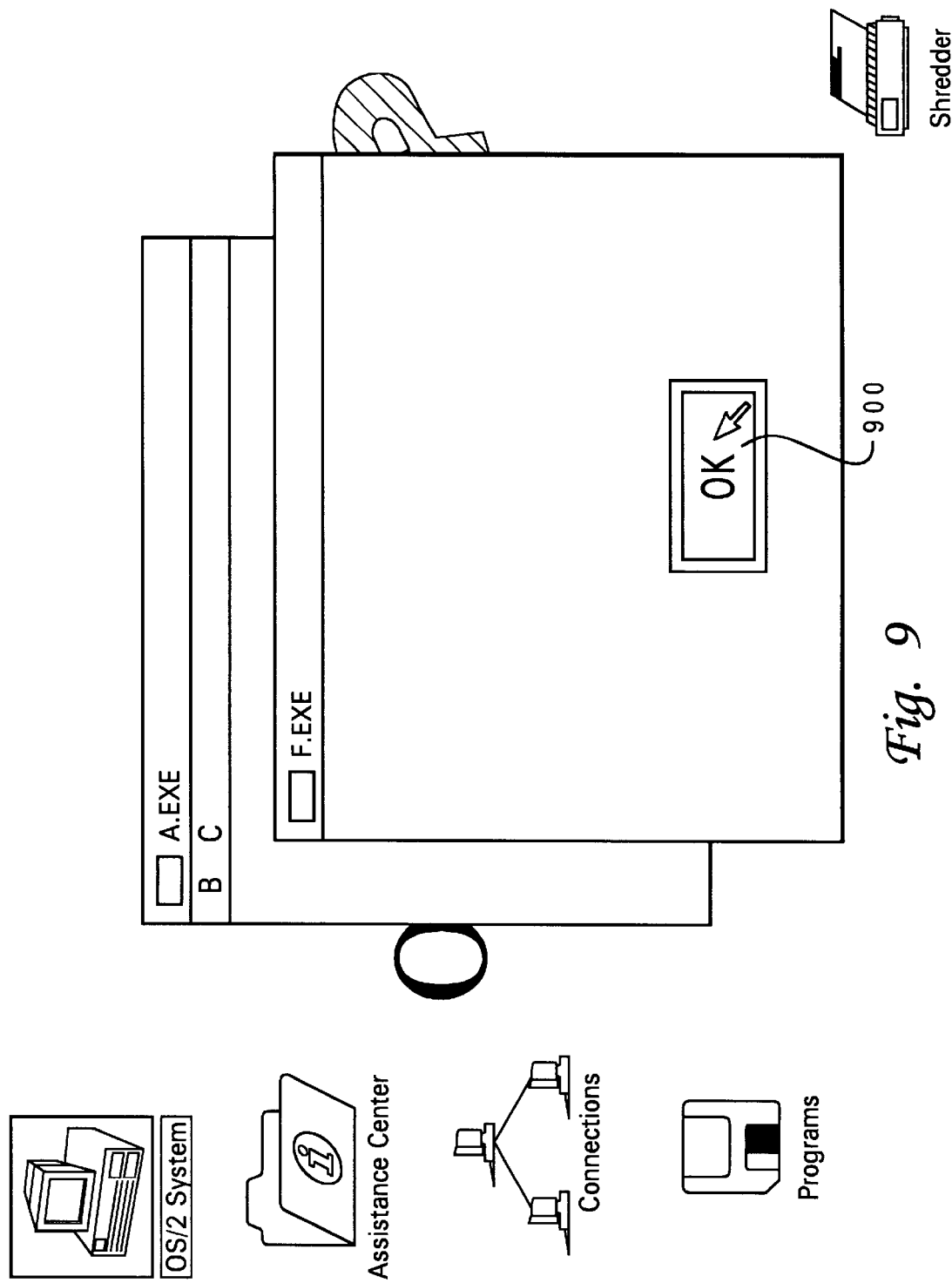
FIG. 9 depicts the selection of the respective "OK" button. When all "OK" buttons have been selected, the application should revert to the state depicted in FIG. 3.
Figure 11:
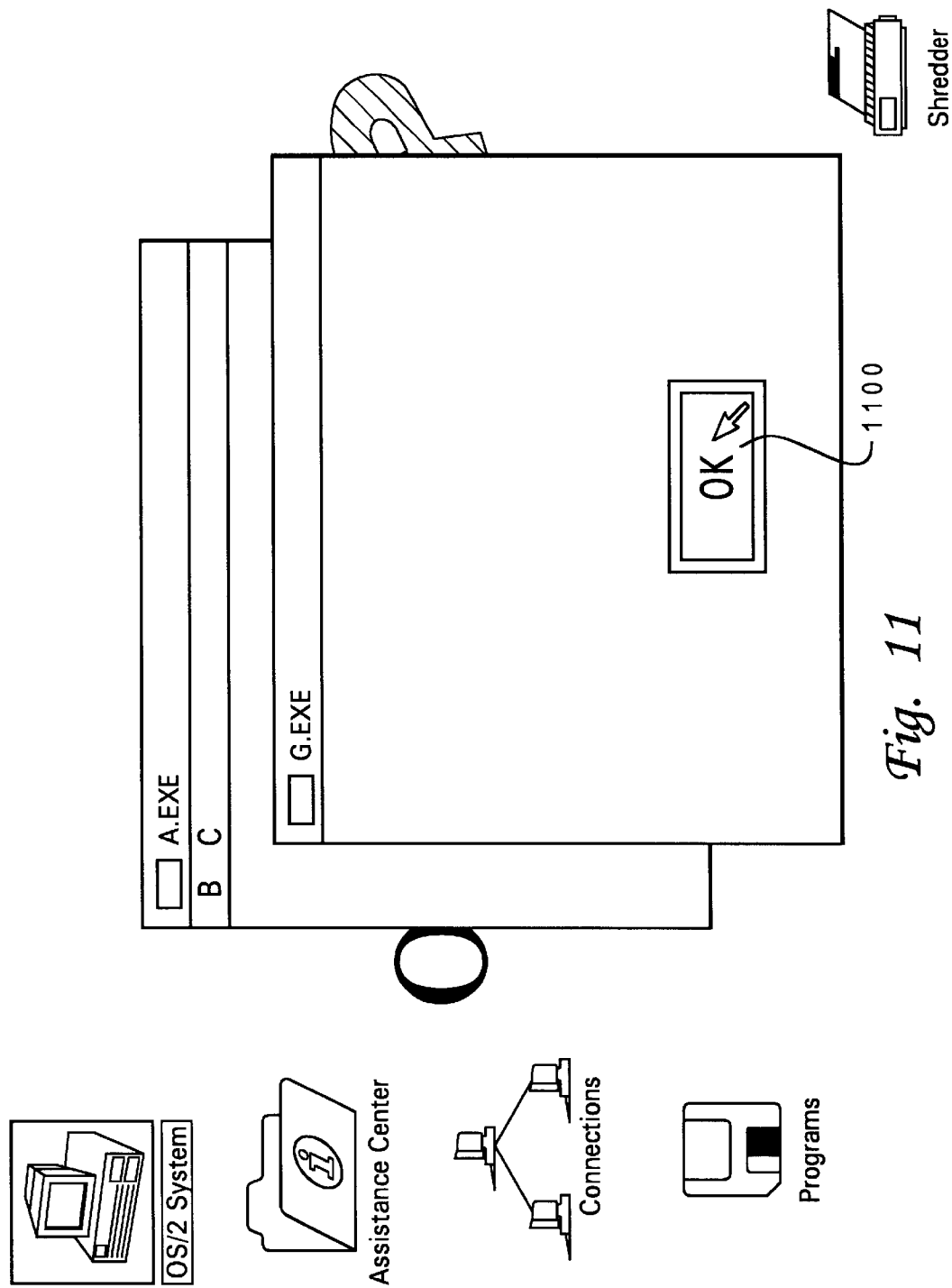
FIG. 11 depicts the selection of the respective "OK" button. When all "OK" buttons have been selected, the application should revert to the state depicted in FIG. 3.
Figure 13:
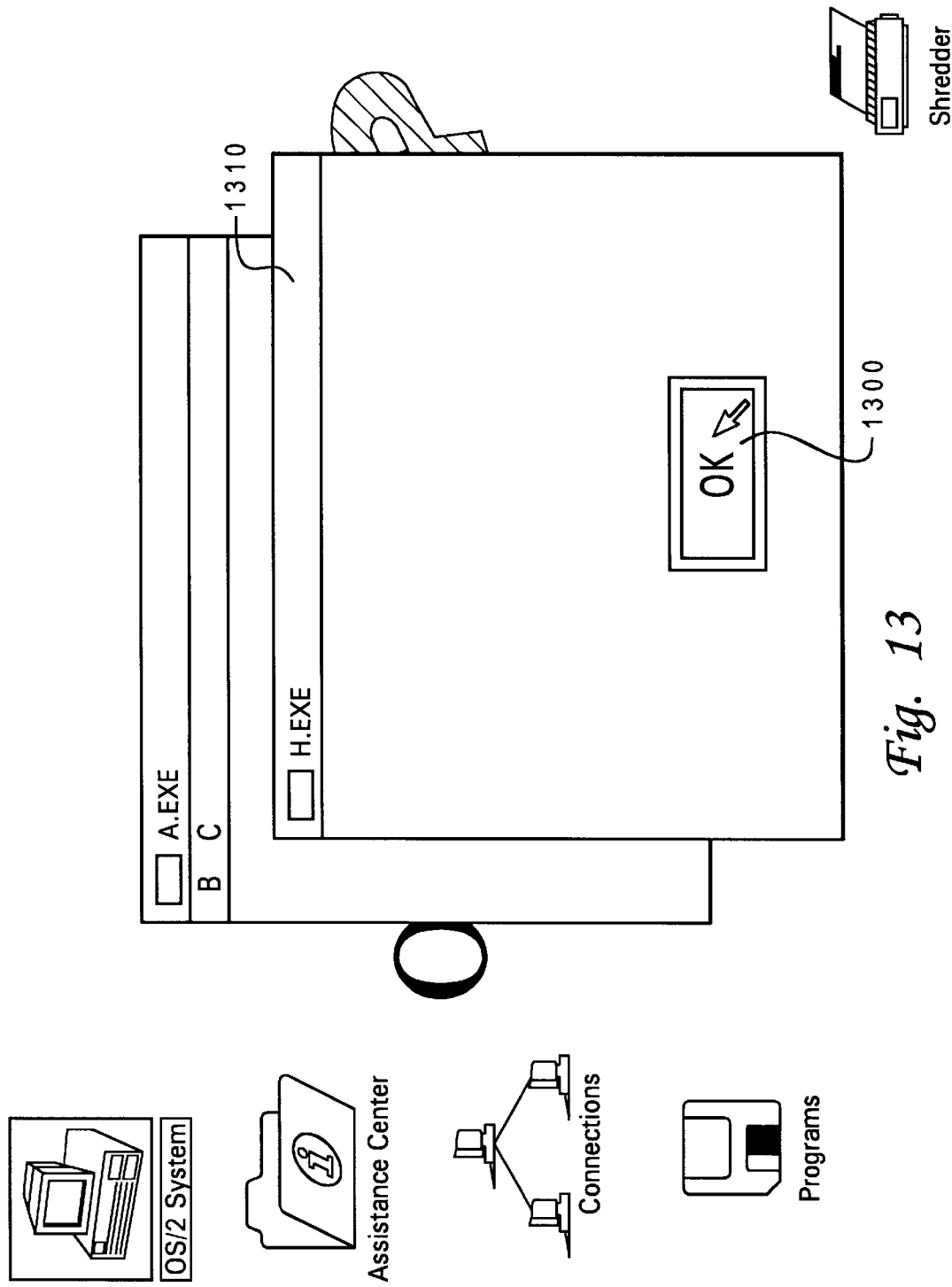
FIG. 13 depicts the selection of the respective "OK" button. When all "OK" buttons have been selected, the application should revert to the state depicted in FIG. 3.
Figure 14A:
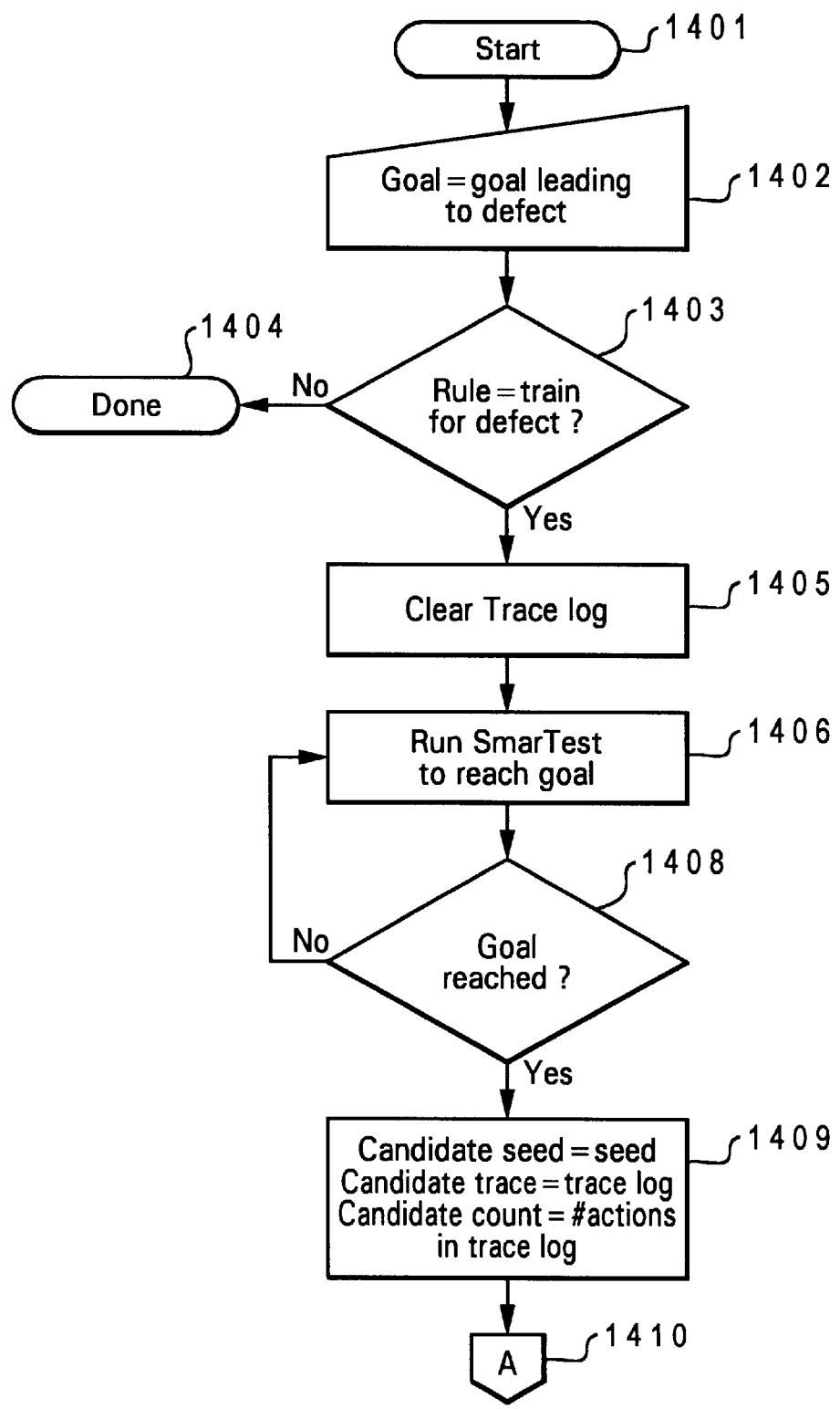
FIGS. 14A–14D together form a high-level logic flow chart which illustrates a method for training an automated software test to seek out a particular known defect.
Figure 14B:
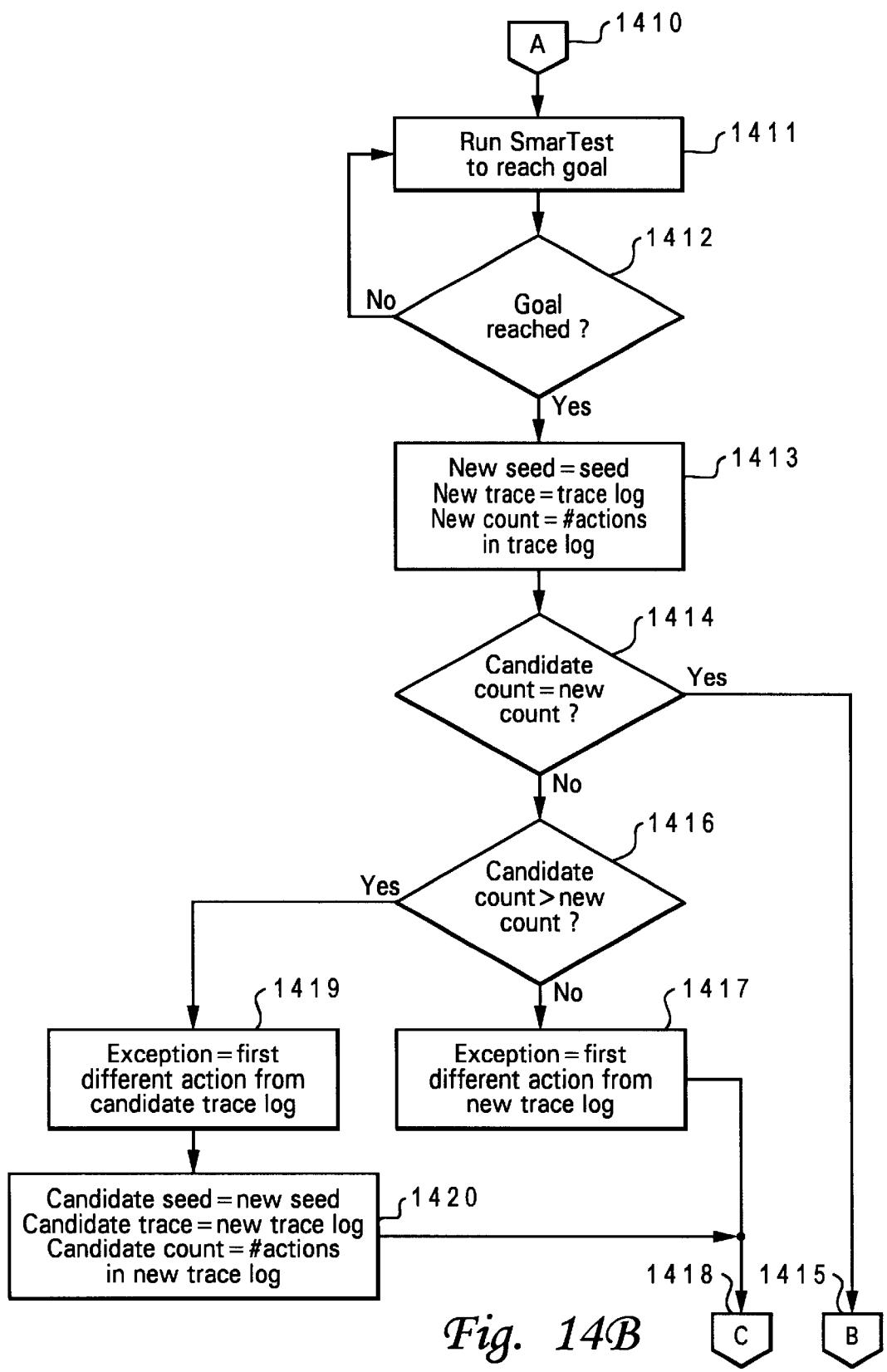
Figure 14C:
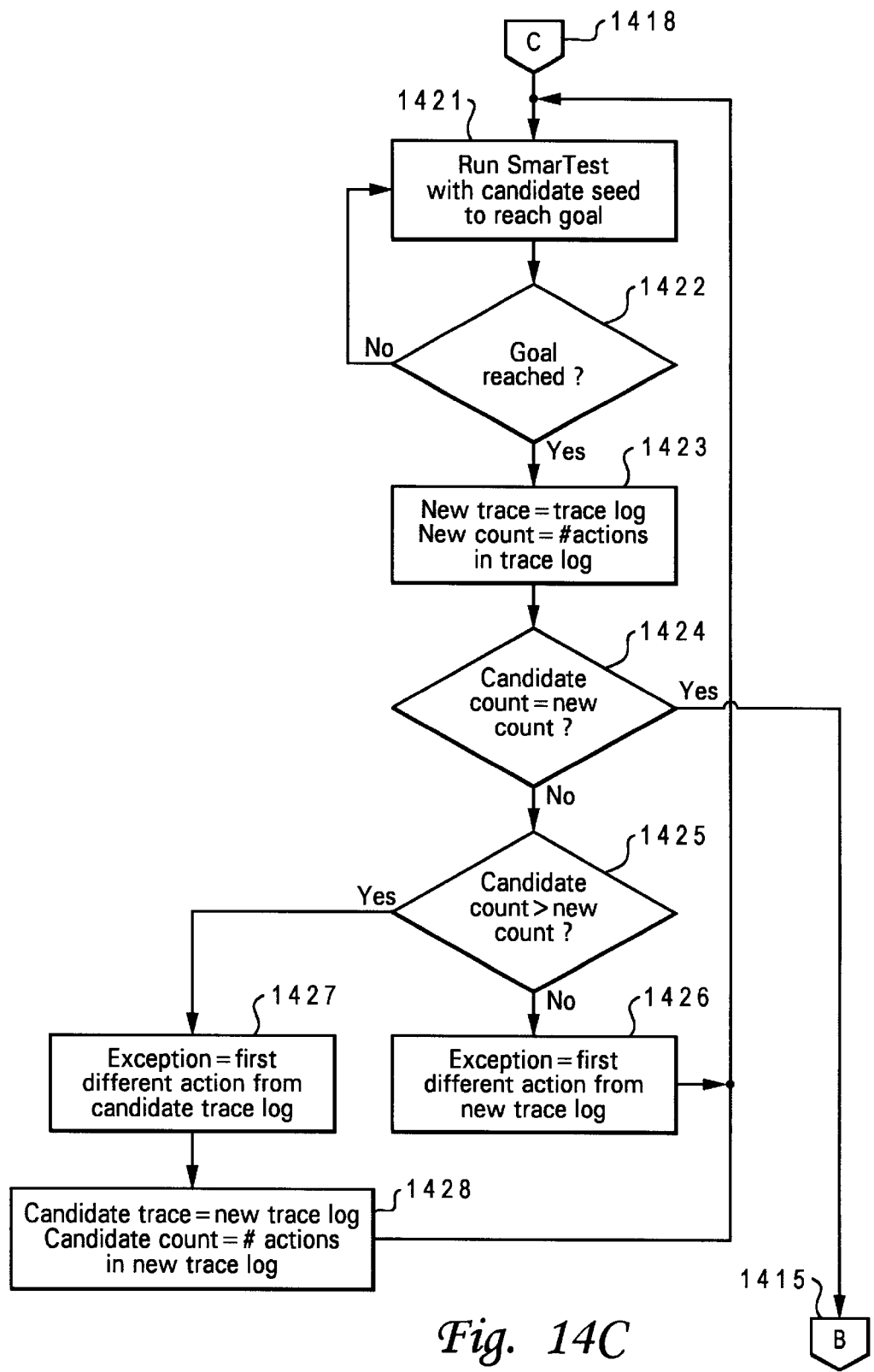
Figure 14D:
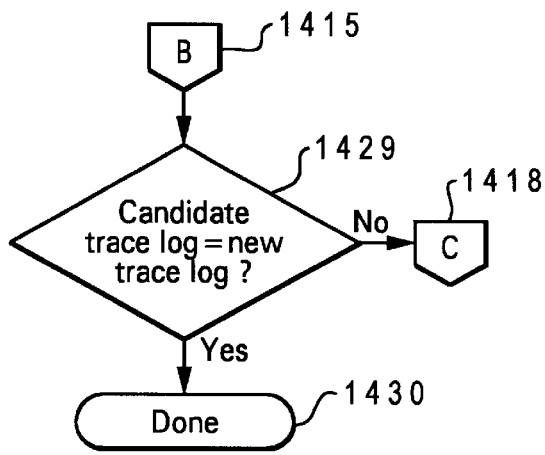

FIG. 9 at 900, FIG. 11 at 1100 and FIG. 13 at 1300 depict the selection of the respective "OK" button, window H is at 1310. When all "OK" buttons have been selected, the application should revert to the state depicted in FIG. 3.

A model of the application in hierarchical top down order would be:
1. a main window
2. a menu bar
3a. a window or
3b. drop-down menu
4a. a button
4b. a window
5b. a button This model would select menu items until a window appears, then it will close the window by selecting the button.

How the test will be run without the Tester's use of parameters:

First, the application to be tested will be placed in a known directory on an operating system. This allows for starting the application without the Tester having to know it's name. Both the operating system and the Smart Test's Initialize (FIG. 1 at 100) function are outside the testing space, so Initialize can look into the directory, get the application's name and execute it. This action would result in FIG. 2 changing to FIG. 3.

Second, the test if successful or capable of continuing execution with failure *, requires a rule that if met will stop the test. The rule will be constructed statistically. Under uniform distribution, when FIG. 3 is present, menu item B will be selected on average 50% of the time and menu item C will be selected 50% of the time. If menu item B is to be selected (FIG. 4), then on average menu item D and menu item E will be selected 50% of the time, or overall, menu item D and menu item E will be selected 50% times 50% or on average 25% of the time. Menu item E is the one we are interested in our test because it results in window H (FIG. 12). We can, therefore, assume on average that every fourth window that appears with an "OK" button will be window H. We need only one occurrence to do our test. Assuming a Poisson distribution and running the test for only four occurrences of the "OK" button, then stopping will result in window H being tested only 50% of the time. Assuming a Poisson distribution and running the test for ten occurrences of the "OK" button, then stopping will result in window H being tested 99.8% of the time. We'll assume that 99% or greater is acceptable.

* designates the case where a failure prohibits "OK" buttons from appearing is ignored, as well as traps, hangs and internal processing errors.

The facts* would be:
1. the failure log=Failure.log
2. the trace log=Trace log
3. the path to the application=d:\test\application
4. the number of buttons required=0
5. Initialization starts the application
   there are no exceptions in this example, an exception might exist if one of the menu items or buttons caused the system to shutdown The goals* would be:
1. find the number of buttons required
   * there are no subgoals in this example, a subgoal might be used to assure an event occurs before the main goal is reached (for example, finding window F before testing for window H).

The rules, FIG. 1 at 107, hierarchical top down, would be:
1. if the desktop does not contain the main window of the application under test, then log a failure and stop the test
2. if a window, then take no action
3. if the goal is met, then stop the test
4. if the button is pressed and another button exists, then log a failure
5. if buttons exist, then select a button and increase the button count by one
6. if menu items exist, then select one menu item The test would run as follows, assuming no failures:

Initialization assigns the trace.log and failure.log as defined facts. It starts the application under test. The model, FIG. 1 at 101, takes over control of the test. It queries the desktop for the A window. It tests the rules, FIG. 1 at 101, and rule 2, noted above, applies a null action be taken. The model, FIG. 1 at 101, dictates that the application's menu bar is to be queried for it's content. It returns B & C, tests the rules and rule 6 applies. It then quasi-randomly selects either B or C. The model then indicates that either a window or a drop-down menu will occur. The application is queried for a window first. If F exists, then test the rules and rule 5 applies. At this point, on this path the model returns to the beginning and runs again. If F does not exist, then a drop-down menu is queried for menu items. It will return D & E. It will test rules and rule 6 applies. It will then quasi-randomly select D or E. The model then indicates that a window will appear. The window is queried and it is either G or H. Test the rules and rule 2 applies. A null action is taken. The model then indicates buttons. It returns the "OK" button. Test the rules and rule 5 applies. At this point, on this path the model returns to the beginning and runs again. After rule 5 has been applied ten times, the goal is met and rule 3 applies. Rule 1 is to cover the case where the application didn't start and rule 4 for the case where the F, G or H windows failed to close.

The test is verified by interrogating the trace and failure logs. The trace log should contain at least one entry of the H window being found. The failure log should contain no failures. Failures are produced from both rules and queries. For example, if the model indicates that buttons should exist and none are found then the query will return a failure.

The following Program Code, written in REXX language, demonstrates a system for automated software testing, described herein as "Smart Test" which can be trained in accordance with the method and system of the present invention.

```
*
$Id: SmarTest.cmd,v 2.2 1998/10/18 23:32:00 rccox Exp $
*/
/* trace ?i */
/*
**********************************************************************
******************
*
*
*
* © Copyright, IBM Corporation, 1998
*
* This program is a simple demonstration of a smart automated testing method. A model of
* the system under test, in this case an application, is coded in this program. The
* application under test is driven by quasi random actions. Results are queried and are
* subjected to a simple rules engine that modifies the behavior of the test and validates
* any goals. In this simple example, the validation of a goal will terminate the
* execution of the test. Although the tests appear to be random for each execution, a
* test can be repeated by including the goal and the seed in the command line.
*
* Command Line: SmarTest [goal number] [seed]
*
* Executing SmarTest.cmd without a goal number and seed results in a quasi random
* selection of one of 8 goals and actions performed on the application. The Application
* is called HiWorld.exe and may be run by itself to determine all its functions. Watch out
* for the ones like "Reboot" etc.!
*
* For a quick look, execute SmarTest 1, then SmarTest 1 again. Note that each execution is
* different. Now execute SmarTest 1 X, where X is one on the seed numbers noted in one of
* the previous two executions. Note that the executions where the seed numbers are the same
* are identical. Confirm the above by viewing Trace.log.
*
* This simple demonstration assumes that the only application running is SmarTest.cmd,
* a REXX program with its extensions, and of course, HiWorld.exe. The quasi random
* distributions are all uniform, thus goal 1 will likely be found much faster than
```

-continued

```
goal 2
* with all other goals likely being found between these two extremes. Upon
completion,
* the file, Failure.log will contain any failures found and the file, Trace.log will
contain
* a script-like log of all actions taken. The re-usable parts are: Initialize, Actions,
* Queries, Exceptions and Logging. The Facts, Goals, Rules and Model are
application
* dependent. The REXX extension, APMT is used here, but this same
architecture can be
* used with tools such as JavaStar.
*
* Why would one want to do this? There are many reasons, but the most
outstanding is
* that it is an automated "Gorilla" testing method and you don't need to have a
complete
* understanding of what you are going to be testing. In other words, a true "black
box"
* testing method. It also doesn't require the use of the system under test's
parameters.
*
* I'm Bob Cox and can be found in IBM Austin at T/L 678-1795 or
rccox@us.ibm.com.
*
* Defects fixed so far:
* 1. OK button is sometimes pressed twice in a row.
* 2. When the mouse indicator is hid, you can't easily stop this thing.
* 3. The model doesn't run error free when all the rules are eliminated
* 4. Trace log consistancy improved
* 5. Robustly designed beep slider bar causes mouse click errors
* 6. Trap when menu item or button can't be found
* 7. Fixed the level 3 model problem created by adding training
* 8. Added some criptic debug messages to be written to screen
*
* New Function added:
* 1. Training
* 2. Find a nonparametric goal
*
* Training:
* Say you want to train this such that a goal can be reached in the shortest
amount of
* steps. All you need to do is change the command line as follows:
*
* Command Line: SmarTest [goal number] learn
*
* A message will appear telling you that training is complete. From this point on
each
* time you invoke SmartTest with the trained goal number it will run with the
shortest
* amount of steps. Try it by entering "SmarTest 1 Learn" and then run "SmarTest
1" or
* "SmarTest 1 [seed number]". It will run always run the shortest amount of steps.
*
* To untrain the goal, all you need to do is enter the following command line:
*
* Command Line: SmarTest [goal number] forget
*
* You're now back to where the quasi random path to the goal will take place.
*
* Find a nonparametric goal:
* One of the primary advantages of using this testing technique is that it doesn't
require
* the use of parameters. Parameters are those things such as window names, the
position of
* a menu item in the drop down menu, etc. It is easy to see how one could start
HiWorld
* without using it's name. You can do it by putting it into a special directory and
then
* starting any application found in the directory. The reason this is not using
parameters
* is because the directory is outside the testing space of the application, HiWorld.
It is
* also easy to see that execution doesn't require parameters as many objects found
in
* HiWorld were initially unknown to SmartTest except as a model element. For
example:
* many of the Information drop down menu items. What is not so easy to see is
how you
* define a goal without using parameters. Here's a method:
```

-continued

```
* Assume you want to find the beep button without naming it because you want your
* test case language independent. First you'll define a goal called
"EnoughButtonsToFindBeep".
* Now you need to find enough of the buttons to insure that at least one is a beep
* button. Then look in the trace log (outside the testing space) to verify you
found one. Goal
* number 8 is a nonparametric goal that when used will find at least one beep
button. Of course,
* training goal number 8 is meaningless because the training solution must
converge on a single
* defined entity. Goal number 8 is multiple undefined entities. But training can
be accomplished in
* two steps. First identify the beep button's name in the trace log. Then make it
a goal. Then train
* that goal.
*
**********************************************************************
******************
*/
/*
*****************************
* Facts
*****************************
*/
TestLog = "Trace.log"
FailLog = "Failure.log"
TrainingFile = "Goal"
Application = "HiWorld.exe"
ApplicationWindowName = "Hi, World"
WorkingDirectory = directory()
MenuItemException.0 = 5    /* the following menu items will not be
selected */
MenuItemException.1 = "~Logoff"  /* this will log you off the LAN */
MenuItemException.2 = "S~hutdown"    /* this will shut down OS/2 */
MenuItemException.3 = "~Reboot"     /* this will reboot the system */
MenuItemException.4 = "~Hide"    /* this will hide the mouse indicator */
MenuItemException.5 = " "     /* this is normally the line between menu items
ButtonException.0 = 1     /* the following buttons will not be pushed */
ButtonException. 1 = " "  /* an unmarked button */
BeepMenuLevelTwo = "Beep . . . "
BeepWindowName = "Beep settings"
BeepDoneButton = "Done"
CustomCursorWindow = "Custom Cursor"
ColorInformationWindow = "Color Information"
ScreenDimensionWindow = "Screen Dimensions"
MadeGoal = "Off"
Learn = "Off"
CandidatePosition = 0
NoNew = 0
SumTotal = 7
StatisticallySigficicant = 0.588
NewButton.0 = 0
Button = " "
/*
**********************************************************************
******************
* potential Goals - one will be randomly chosen, if not selected in command line
**********************************************************************
******************
*/
Result.0 = 8
Result.1 = "Beep" /* the beep button in the Beep Window */
Result.2 = "Window text is Red" /* text in the Color Information Window */
Result.3 = "Window text is Black" /* text in the Color Information Window */
Result.4 = "Screen Dimensions" /* the Screen Dimensions Window */
Result.5 = "Time since system was booted" /* a Time Window */
Result.6 = "Local time"           /* a Time Window */
Result.7 = "System Time (UTC)"       /* a Time Window */
Result.8 = "EnoughButtonsToFindBeep" /* find the "Beep" button by
nonparametric means */
signal Initialize /* REXX method to bypass rules */
/*
*****************************
* Rules
*****************************
*/
Rules:
if Learn = "On" & MadeGoal = "On" then do
```

-continued

```
      call CleanUpApplication
      rc = END_SESSION() ; call LogFunction
      rc = Training()
      if rc > 0 then do
         '@del 'TrainingFile||'.? 2>null'
         return 5
      end
      if TrainingCheck > 7 then do
         '@del 'TrainingFile||'.? 2>null'
         say "Training complete."
         return 0
      end
      return 4
end
if MadeGoal = "On" then return 0
if Learn = "On" then do
      File.0 = 0
      call sysFileTree TrainingFile||'.x', 'File.', 'FO'
      if File.0 > 0 then do
         call sysFileSearch "Return code", TrainingFile||'.t', 'LongFileLine.'
         call sysFileSearch "Return code", TrainingFile||'.s', 'ShortFileLine.'
         if LongFileLine.0 > ShortFileLine.0 | LongFileLine.0 = ShortFileLine.0 then
do
            do j = 1 to ShortFileLine.0
               if LongFileLine.j <> ShortFileLine.j then leave
            end
            if j > ShortFileLine.0 | j = ShortFileLine.0 then do
               KeepIt = lineIn(TrainingFile||'.x', 1, 1)
               say KeepIt "Keep it"
               call lineOut TrainingFile||'.x'
               call lineOut TrainingFile||'.k', KeepIt
               call lineOut TrainingFile||'.k'
               '@del 'TrainingFile||'.x'
               return 4
            end
            call lineOut TrainingFile||'.x'
            '@del 'TrainingFile||'.x'
         end
      end
end
if Button = Goal then do
      Button = " "
      rc = PUSHBUTTON_CLICK("Done") ; call LogFunction ; call LogFailure
      return 1
end
if Button = "Beep" & Result.8 <> Goal then do
      Button = " "
      return 2
end
if Result.8 = Goal then do
      if Button <> " " then do
         do k = 1 to 1
            if NewButton.0 = 0 then do
               NewButton.0 = 1
               NewButton.1 = Button
            end
            do j = 1 to NewButton.0
               if NewButton.j = Button then do
                  NoNew = NoNew + 1
                  TempTotal = SumTotal + 1
                  StatisticTest = NoNew / TempTotal
                  if StatisticTest > StatisticallySigficicant then return 1
                  leave k
               end
            end
            NoNew = 0
            NewButton.0 = NewButton.0 + 1
            NewButton.j = Button
         end
         SumTotal = SumTotal + 1
      end
      if Button = "Beep" then do
         Button = " "
         return 2
      end
      Button = " "
end
if WhatWindowResult = Goal then do
      WhatWindowResult = " "
```

-continued

```
        call WAIT(100)
        rc = PUSHBUTTON_CLICK("OK") ; call LogFunction ; call LogFailure
        return 1
end
if WhatWindowResult = ScreenDimensionWindow then do
        WhatWindowResult = " "
        return 3
end
if subStr(Text,1,18) = subStr(Goal,1,18) then do
        Text = " "
        call WAIT(100)
        rc = PUSHBUTTON_CLICK("OK") ; call LogFunction ; call LogFailure
        return 1
end
return 0
/*
******************************
* Initialize
******************************
*/
Initialize:
signal on HALT Name ByeBye
call rxFuncAdd "SysLoadFuncs","RexxUtil","SysLoadFuncs"
call SysLoadFuncs
call rxFuncAdd 'APMTLoadFuncs','APMTEXT','APMTLoadFuncs'
call APMTLoadFuncs
parse upper arg GoalNumber Seed
if GoalNumber > Result.0 then do
        Seed = GoalNumber
        GoalNumber = " "
end
if Seed = " " then Seed = time('S')
TrainingFile = 'Goal'||GoalNumber
File.0 = 0
call sysFileTree TrainingFile||'.xxx', 'File.', 'FO'
if Seed = "LEARN" & GoalNumber <> 0 then do
        Learn = "On"
        TrainingCheck = 0
        Seed = time('S')
end
if (Seed = "FORGET" & GoalNumber <> 0) then do
        'del Goal'||GoalNumber||'.xxx'
        signal ByeBye
end
File.0 = 0
call sysFileTree 'Goal'||GoalNumber||'.xxx', 'File.', 'FO'
if File.0 > 0 then do
        InputRecord = lineIn('Goal'||GoalNumber||'.xxx',1,1)
        InputRecord = lineIn('Goal'||GoalNumber||'.xxx')
        parse value InputRecord with Scratch"Seed = "Seed
        Goal = Result.GoalNumber
        say "Goal = "GoalNumber": ("Goal") and test case has been trained."
        call random 1, Result.0, Seed
end
else do
        if GoalNumber = " " | GoalNumber = 0 then GoalNumber =
random(1,Result.0,Seed)
        else call random 1, Result.0, Seed
        Goal = Result.GoalNumber
        say "Goal = "GoalNumber": ("Goal") and Seed = "Seed
end
if Learn = "On" & File.0 = 0 then do
        TrainingFile = 'Goal'||GoalNumber
        ShortSeed = Seed
        call lineOut TrainingFile||'.xxx', 'Run 'date() time()
        call lineOut TrainingFile||'.xxx', 'Goal = 'GoalNumber' and Seed = 'Seed
        call lineOut TrainingFile||'.xxx'
end
if Learn = "Off" then do
        call lineOut Testlog, 'Run 'date() time()
        call lineOut TestLog, 'Goal = 'GoalNumber' and Seed = 'Seed
        call lineOut Testlog
        call lineOut FailLog, 'Run 'date() time()
        call lineOut FailLog, 'Goal = 'GoalNumber' and Seed = 'Seed
        call lineOut FailLog
end
say Learn
TrainingStartPoint:
rc = InitializeTestCase() ; call LogFailure
```

```
if rc <> 0 then signal ByeBye
call WAIT(1000)
/*
**********************************************************************
*******
* Model of Application (single subwindow open and single execution model)
**********************************************************************
*******
*/
BeginApplication:
rc = StartApplication() ; call LogFailure
if rc <> 0 then signal ByeBye
MenuSelect:
Level = 1                       /* select an item from the menu bar */
rc = WhatMenu() ; call LogFailure
if rc <> 0 then signal ByeBye
rc = SelectMenuItem() ; call LogFailure
if rc <> 0 then signal ByeBye
Item1 = MenuItem
Item2 = " "
Item3 = " "
rc = Rules()
Level = 2                       /* select an item from the first drop down menu */
WindowName = ApplicationWindowName        /* select an item
from the first drop down menu */
call SELECT_WINDOW ApplicationWindowName, 10
rc = 1
do while rc <> 0
     rc = WhatWindow()
     call SELECT_WINDOW ApplicationWindowName, 10
end
rc = WhatMenu() ; call LogFailure
if rc <> 0 then signal ByeBye
rc = SelectMenuItem() ; call LogFailure
if rc <> 0 then signal ByeBye
Item2 = MenuItem
BeepWindowUp:
if MenuItem = BeepMenuLevelTwo then do      /* If it is the Beep menu item then
go to the Beep window model */
     rc = StartBeep() ; call LogFailure
     if rc <> 0 then signal ByeBye
     rc = Rules()            /* apply applicable rules */
     if rc = 1 then signal GoalAttained   /* a goal was found */
     if rc = 2 then signal BeepWindowUp  /* a rule applied */
     if rc = 4 then signal BeginApplication /* a training return */
     if rc = -1 then signal ByeBye    /* an error return */
     WindowName = ApplicationWindowName       /* no rules applied, so continue
*/
     rc = SelectWindow() ; call LogFailure
     signal MenuSelect           /* Go back and select a new menu item */
end
rc = WhatWindow()              /* Make sure the application wasn't
exited */
if WhatWindowResult <> ApplicationWindowName then signal BeginApplication
/* it was */
WindowName = ScreenDimensionWindow      /* See if the Screen Dimensions
Window is up */
call WhatWindow
rc = Rules()
if rc = 1 then signal GoalAttained     /* It was and it's the goal */
if rc = 3 then do     /* it was and it's not the goal */
     call WAIT(100)
     rc = PUSHBUTTON_CLICK("OK") ; call LogFunction; call LogFailure
     rc = Rules()            /* apply applicable rules */
     WindowName = ApplicationWindowName
     rc = SelectWindow() ; call LogFailure
     signal MenuSelect
end
if rc = 4 then signal BeginApplication /* a training return */
if rc = -1 then signal ByeBye      /* an error return */
Level = 3
call SELECT_WINDOW ApplicationWindowName, 10
rc = WhatMenu()
if rc <> 0 then signal MenuSelect
rc = SelectMenuItem() ; call LogFailure
if rc <> 0 then signal ByeBye
Item3 = MenuItem
do j = 1 to Result.0    /* check if any of these windows are possible goals
*/
```

```
    WindowName = Result.j
    WindowInQuestion = Result.j
    rc = WhatWindow()
    if WhatWindowResult = WindowInQuestion then do    /* a possible goal found */
        rc = Rules()                       /* check it out */
        if rc = 1 then signal GoalAttained         /* it's a goal */
        if rc = 4 then signal BeginApplication /* a training return */
        if rc = -1 then signal ByeBye     /* an error return */
        rc = WhatButtons()                         /* it's not a goal, so close it */
        if rc = 0 then do
            rc = PUSHBUTTON_CLICK("OK") ; call LogFunction ; call LogFailure
            rc = Rules()                  /* apply applicable rules */
        end
    end
end
WindowName = CustomCursorWindow       /* is it the Custom Cursor
Window? if so rules apply */
rc = WhatWindow()
if WhatWindowResult = CustomCursorWindow then do
    rc = WhatButtons() ; call LogFailure
    if rc <> 0 then signal ByeBye /* an error return */
    rc = PushButton() ; call LogFailure
    rc = Rules()
    call WhatWindow
    do while WhatWindowResult = CustomCursorWindow
        rc = WhatButtons() ; call LogFailure
        if rc <> 0 then signal ByeBye  /* an error return */
        rc = PushButton() ; call LogFailure
        rc = Rules()
        rc = WhatWindow()
    end
end
if WhatWindowResult = CustomCursorWindow then do    /* If it is check for rules */
    rc = Rules()
    if rc = 4 then signal BeginApplication /* a training return */
    if rc = -1 then
    if rc <> 0 then signal MenuSelect    /* applied the rules, go back and select
another menu item */
end
WindowName = ColorInformationWindow       /* is it the Color Information
Window? if so rules apply */
rc = WhatWindow()
if WhatWindowResult = ColorInformationWindow then do
    rc = WhatText() ; call LogFailure
    rc = Rules()
    if rc = 1 then signal GoalAttained   /* it was the goal */
    if rc = 4 then signal BeginApplication    /* a training return */
    if rc = -1 then signal ByeBye  /* an error return */
    call WAIT(100)
    rc = PUSHBUTTON_CLICK("OK") ; call LogFunction; call LogFailure
    rc = Rules()              /* apply applicable rules */
end
WindowName = ApplicationWindowName    /* enough of this, select a new
menu item */
rc = SelectWindow() ; call LogFailure
signal MenuSelect
GoalAttained:
MadeGoal = "On"
WindowName = ApplicationWindowName    /* goal attained, let everyone
know and shut it down */
rc = SelectWindow() ; call LogFailure
rc = CloseWindow() ; call LogFailure
rc = Rules()
if rc = 4 then do              /* a good training return */
    MadeGoal = "Off"
    signal TrainingStartPoint
end
if rc = -1 then signal ByeBye    /* an error return */
if rc = 5 then signal ByeBye      /* a bad training return */
if rc = 0 & Learn = "On" then signal ByeBye   /* training done */
call lineOut FailLog, "Goal "GoalNumber" attained."
call lineOut FailLog
say "Goal "GoalNumber" attained."
signal ByeBye
/* Application Model subroutines */
StartApplication:                /* This starts up the application under test */
rc = SELECT_WINDOW(ApplicationWindowName)
```

-continued

```
if rc = 0 then return 0
rc = StartProgram() ; call LogFailure
call WAIT 1500
WindowName = ApplicationWindowName
rc = SelectWindow() ; call LogFailure
rc = WhatWindow() ; call LogFailure
if rc <> 0 then return 1
if WhatWindowResult <> ApplicationWindowName then return 1
return 0
StartBeep:           /* This is the Beep Window model, it will set a beep
frequency & duration */
WindowName = BeepWindowName    /* and it will select any buttons that exist */
rc = SelectWindow() ; call LogFailure
rc = WhatWindow() ; call LogFailure
if rc <> 0 then return 1
if WhatWindowResult <> BeepWindowName then return 1
X = random(20,80)              /* This is a poorman's slider bar
manipulator. */
Y = random(20,80)              /* There should be a slider bar action in its
place. */
call CLASS_SET_POINTER '#8',1,X,100,5,10   /* There are two reasons why
you don't see the action */
do j = 1 to 10                 /* and this instead. First is that I'm too lazy
to */
    call MOUSE 'CLICK',1       /* design it. Second is without a slider
bar manipulator, */
end                            some critic will say "This ain't no good,
because */
call CLASS_SET_POINTER '#8',2,Y,100,5,10   /* the slider bar doesn't work!"
Hey, this is a demo!! */
do j = 1 to 10
    call MOUSE 'CLICK',1
end
rc = WhatButtons() ; call LogFailure
if rc <> 0 then return 1
rc = PushButton() ; call LogFailure
return 0
/*
**********************************
* Actions
**********************************
*/
InitializeTestCase:
rc = INIT_SESSION() ; call LogFunction
return rc
StartProgram:
rc = START_PROGRAM(Application," ",WorkingDirectory) ; Call
LogStartProgram
call WAIT random(100,1000)
return rc
SelectWindow:
rc = SELECT_WINDOW(WindowName,10) ; call LogSelectWindow
if WindowName = ApplicationWindowName then call WAIT 1000
call WAIT random(100,1000)
return rc
SelectMenuItem:
Choice = random(1,WhatMenuResult.0)
MenuItem = WhatMenuResult.Choice
rc = TestForMenuItemExceptions()
if rc <> 0 then signal SelectMenuItem
select
    when Level = 1 then do
       rc = MENU_SELECT(MenuItem) ; call LogSelectMenuItem
    end
    when Level = 2 then do
       rc = MENU_SELECT(Item1,MenuItem) ; call LogSelectMenuItem
    end
    when Level = 3 then do
       rc = MENU_SELECT(Item1,Item2,MenuItem) ; call LogSelectMenuItem
    end
    when Level = 4 then do
       rc = MENU_SELECT(Item1,Item2,Item3,MenuItem) ; call
LogSelectMenuItem
    end
    when Level = 5 then do
       rc = MENU_SELECT(Item1,Item2,Item3,Item4,MenuItem) ; call
LogSelectMenuItem
    end
    when Level = 6 then do
```

-continued

```
        rc = MENU_SELECT(Item1,Item2,Item3,Item4,Item5,MenuItem) ; call
LogSelectMenuItem
        end
    when Level = 7 then do
        rc = MENU_SELECT(Item1,Item2,Item3,Item4,Item5,Item6,MenuItem) ; call
LogSelectMenuItem
        end
    when Level = 8 then do
        rc = MENU_SELECT(Item1,Item2,Item3,Item4,Item5,Item6,Item7,MenuItem)
; call LogSelectMenuItem
        end
    when Level = 9 then do
        rc =
MENU_SELECT(Item1,Item2,Item3,Item4,Item5,Item6,Item7,Item8,MenuItem) ;
call LogSelectMenuItem
        end
    otherwise do
        call lineOut FailLog, "Test Case error caused by not defining or not having
enough levels in the SelectMenuItem subroutine"
        call lineOut FailLog
        return 1
    end
end
call WAIT random(100,1000)
return rc
PushButton:
Choice = random(1,Buttons.0)
Button = Buttons.Choice
rc = TestForButtonExceptions()
if rc <> 0 then signal PushButton
rc = PUSHBUTTON_CLICK(Button) ; call LogPushButton
call WAIT random(100,1000)
return rc
CloseWindow:
rc = SYSMENU_SELECT("Close") ; call LogFunction
call WAIT random(100,1000)
return rc
ByeBye:
rc = END_SESSION() ; call LogFunction
exit
/*
***********************************
* Queries
***********************************
*/
WhatWindow: procedure expose WhatWindowResult WindowName
j = 1
rc = 0
do while rc = 0
    rc = SELECT_WINDOW("*",1,j)
    if rc = 0 then do
        call QUERY_TITLE 'WhatWindowResult'
        if WhatWindowResult = WindowName then leave
        WhatWindowResult = " "
    end
    j = j + 1
end
if WhatWindowResult = " " then return 1
return 0
WhatMenu:
select
    when Level = 1 then rc = MENU_QUERY_ALL("WhatMenuResult")
    when Level = 2 then rc = MENU_QUERY_ALL(Item1,"WhatMenuResult")
    when Level = 3 then rc =
MENU_QUERY_ALL(Item1,Item2,"WhatMenuResult")
    when Level = 4 then rc =
MENU_QUERY_ALL(Item1,Item2,Item3,"WhatMenuResult")
    when Level = 5 then rc =
MENU_QUERY_ALL(Item1,Item2,Item3,Item4,"WhatMenuResult")
    when Level = 6 then rc =
MENU_QUERY_ALL(Item1,Item2,Item3,Item4,Item5,"WhatMenuResult")
    when Level = 7 then rc =
MENU_QUERY_ALL(Item1,Item2,Item3,Item4,Item5,Item6,"WhatMenuResult")
    when Level = 8 then rc =
MENU_QUERY_ALL(Item1,Item2,Item3,Item4,Item5,Item6,Item7,"WhatMenuResult")
    when Level = 9 then rc =
MENU_QUERY_ALL(Item1,Item2,Item3,Item4,Item5,Item6,Item7,Item8,"WhatMenuResult")
    otherwise do
        call lineOut FailLog, "Test Case error caused by not defining or not having
```

-continued

```
enough levels in the WhatMenu subroutine"
        call lineOut FailLog
        return 1
    end
end
if WhatMenuResult.0 = 0 | WhatMenuResult.0 = " " | WhatMenuResult.0 =
"WHATMENURESULT" then return 1
return 0
WhatButtons:
rc = PUSHBUTTON_QUERY_ALL("Buttons")
if Buttons.0 = 0 | Buttons.0 =" " | Buttons.0 = "Buttons" then return 1
return 0
WhatText:
call WAIT 500
rc = TEXT_QUERY_TEXT('1', "Text")
if Text = " " then return 1
Text = strip(Text)
return 0
/*
****************************************
* Exceptions
****************************************
*/
TestForMenuItemExceptions:
do j=1 to MenuItemException.0
    if MenuItem = MenuItemException.j then return 1
end
select
    when Level = 1 then rc = MENU_QUERY_STATE(MenuItem,State)
    when Level = 2 then rc = MENU_QUERY_STATE(Item1,MenuItem,State)
    when Level = 3 then rc =
MENU_QUERY_STATE(Item1,Item2,MenuItem,State)
    when Level = 4 then rc =
MENU_QUERY_STATE(Item1,Item2,Item3,MenuItem,State)
    when Level = 5 then rc =
MENU_QUERY_STATE(Item1,Item2,Item3,Item4,MenuItem,State)
    when Level = 6 then rc =
MENU_QUERY_STATE(Item1,Item2,Item3,Item4,Item5,MenuItem,State)
    when Level = 7 then rc =
MENU_QUERY_STATE(Item1,Item2,Item3,Item4,Item5,Item6,MenuItem,State)
    when Level = 8 then rc =
MENU_QUERY_STATE(Item1,Item2,Item3,Item4,Item5,Item6,Item7,MenuItem,State)
    when Level = 9 then rc =
MENU_QUERY_STATE(Item1,Item2,Item3,Item4,Item5,Item6,Item7,Item8,MenuItem,State)
    otherwise do
        call lineOut FailLog, "Test Case error caused by not defining or not having
enough levels in the TestForMenuItemExceptions subroutine"
        call lineOut FailLog
        return 1
    end
end
if State.3 = "DISABLED" | State.4 = "INVALID" then return 1
TestException = MenuItem
rc = TestForLearnedExceptions()
return rc
TestForButtonExceptions:
do j=1 to ButtonException.0
    if Button = ButtonException.j then return 1
end
TestException = Button
rc = TestForLearnedExceptions()
return rc
TestForLearnedExceptions:
FileName = TrainingFile||'.xxx'
rc = ReadFile()
if rc = 0 then do
    File.0=0
    call sysFileTree TrainingFile||'.x', 'File.', 'FO'
    if fILE.0 > 0 then do
        FileName = TrainingFile||'.x'
        rc = ReadFile()
    end
end
return rc
/*
****************************************
* Logging
****************************************
*/
```

-continued

```
LogFailure:
Code=Strip(rc)
if Code = 0 then return rc
parse value sourceline(sigl) with 'rc = 'Function';'
Out = Function' on sourceline 'sigl' has failed'
if Learn = "On" then do
     call lineOut TrainingFile||'.f', Out
     call lineOut TrainingFile||'.f'
end
else do
     call lineOut FailLog, Out
     call lineOut FailLog
end
return rc
LogFunction:
Code=strip(rc)
parse value sourceline(sigl) with 'rc = 'Function' ;'
Out = 'Return code 'Code' from 'Function
if Learn = "On" & Function = "END_SESSION()" then return 0
if Learn = "On" then do
     call lineOut TrainingFile||'.t', Out
     call lineOut TrainingFile||'.t'
end
else do
     if TestLog = "TESTLOG" | TestLog = " " then return 0
     call lineOut TestLog, Out
     call lineOut TestLog
end
return rc
LogStartProgram:
Code=strip(rc)
parse value sourceline(sigl) with 'rc = 'Function' ;'
Out = 'Return code 'Code' from 'Function', Application = 'Application',
WorkingDirectory = 'WorkingDirectory
if Learn = "On" then do
     call lineOut TrainingFile||'.t', Out
     call lineOut TrainingFile||'.t'
end
else do
     call lineOut TestLog, Out
     call lineOut TestLog
end
return rc
LogSelectWindow:
Code=strip(rc)
parse value sourceline(sigl) with 'rc = 'Function' ;'
Out = 'Return code 'Code' from 'Function', WindowName = 'WindowName
if Learn = "On" then do
     call lineOut TrainingFile||'.t', Out
     call lineOut TrainingFile||'.t'
end
else do
     call lineOut TestLog, Out
     call lineOut TestLog
end
return rc
LogSelectMenuItem:
Code=strip(rc)
parse value sourceline(sigl) with 'rc = 'Function' ;'
Out = 'Return code 'Code' from 'Function', MenuLevel = 'Level', MenuItem =
'MenuItem
if Learn = "On" then do
     call lineOut TrainingFile||'.t', Out
     call lineOut TrainingFile||'.t'
end
else do
     call lineOut TestLog, Out
     call lineOut TestLog
end
return rc
LogPushButton:
Code=strip(rc)
parse value sourceline(sigl) with 'rc = 'Function' ;'
Out = 'Return code 'Code' from 'Function', Button = 'Button
if Learn = "On" then do
     call lineOut TrainingFile||'.t', Out
     call lineOut TrainingFile||'.t'
end
else do
```

-continued

```
       call lineOut TestLog, Out
       call lineOut TestLog
end
return rc
/**********
* Training *
**********/
Training: procedure expose ShortFileLength TrainingFile Seed GoalNumber
TrainingCheck ShortSeed Result.0 CandidatePosition
Records.0 = 0
call sysFileSearch "failed", TrainingFile||'.f', 'Records.'
if Records.0 > 0 then do
     Seed = time('S')
     call random 1, Result.0, Seed
     say "failure"
     '@del 'TrainingFile||'.*'
     say "Training Error: a test case failed"
     return 1
end
File.0 = 0
call sysFileTree TrainingFile||'.s', 'File.', 'FO'
if File.0 = 0 then do
     '@rename 'TrainingFile||'.t 'TrainingFile||'.s'
     call sysFileSearch "Return code", TrainingFile||'.s', 'Records.'
     ShortFileLength = Records.0
     ShortSeed = Seed
     Seed = time('S')
     call random 1, Result.0, Seed
     say ShortFileLength
     say "no s record"
     return 0
end
call sysFileSearch "Return code", TrainingFile||'.t', 'Records.'
if Records.0 = ShortFileLength then do
     say ShortFileLength
     say "t = s record"
     call CleanUpTrainingFiles
     TrainingCheck = TrainingCheck + 1
     call sysFileTree TrainingFile||'.x', 'File.', 'FO'
     if File.0 > 0 then do
        Exception = lineIn(TrainingFile||'.x', 1, 1)
        call lineOut TrainingFile||'.x'
        say Exception "Exception"
        call lineOut TrainingFile||'.xxx', Exception
        call lineOut TrainingFile||'.xxx'
        '@del 'TrainingFile||'.x'
     end
     Seed = time('S')
     call random 1, Result.0, Seed
     return 0
end
TrainingCheck = 0
if Records.0 < ShortFileLength then do
     say ShortFileLength
     say "t < 5 record"
     '@del 'TrainingFile||'.l 2>null'
     '@rename 'TrainingFile||'.s 'TrainingFile||'.l'
     '@rename 'TrainingFile||'.t 'TrainingFile||'.s'
     ShortFileLength = Records.0
     ShortSeed = Seed
     File.0 = 0
     call sysFileTree TrainingFile||'.x', 'File.', 'FO'
     if File.0 > 0 then do
        Exception = lineIn(TrainingFile||'.x', 1, 1)
        call lineOut TrainingFile||'.x'
        say Exception "Exception"
        call lineOut TrainingFile||'.xxx', Exception
        call lineOut TrainingFile||'.xxx'
        '@del 'TrainingFile||'.x'
        Seed = time('S')
        call random 1, Result.0, Seed
        return 0
     end
end
else do
     say ShortFileLength
     say "t > s record"
     '@del 'TrainingFile||'.l 2>null'
     '@rename 'TrainingFile||'.t 'TrainingFile||'.l'
```

-continued

```
    call sysFileSearch "Return code", TrainingFile||'.l', 'LongFileLine.'
    call sysFileSearch "Return code", TrainingFile||.s', 'ShortFileLine.'
    do j = 1 to ShortFileLine.0
       if LongFileLine.j <> ShortFileLine.j then leave
    end
    CandidatePosition = j
    do k = 1 to 5
       parse var LongFileLine.j Word LongFileLine.j
    end
    select
       when Word =
"MENU_SELECT(Item1,Item2,Item3,Item4,Item5,Item6,Item7,Item8,MenuItem),"
then do
          parse value LongFileLine.j with "MenuItem = "TestException
       end
       when Word =
"MENU_SELECT(Item1,Item2,Item3,Item4,Item5,Item6,Item7,MenuItem)," then
do
          parse value LongFileLine.j with "MenuItem = "TestException
       end
       when Word =
"MENU_SELECT(Item1,Item2,Item3,Item4,Item5,Item6,MenuItem)," then do
          parse value LongFileLine.j with "MenuItem = "TestException
       end
       when Word = "MENU_SELECT(Item1,Item2,Item3,Item4,Item5,MenuItem),"
then do
          parse value LongFileLine.j with "MenuItem = "TestException
       end
       when Word = "MENU_SELECT(Item1,Item2,Item3,Item4,MenuItem)," then
do
          parse value LongFileLine.j with "MenuItem = "TestException
       end
       when Word = "MENU_SELECT(Item1,Item2,Item3,MenuItem)," then do
          parse value LongFileLine.j with "MenuItem = "TestException
       end
       when Word = "MENU_SELECT(Item1,Item2,MenuItem)," then do
          parse value LongFileLine.j with "MenuItem = "TestException
       end
       when Word = "MENU_SELECT(Item1,MenuItem)," then do
          parse value LongFileLine.j with "MenuItem = "TestException
       end
       when Word = "MENU_SELECT(MenuItem)," then do
          parse value LongFileLine.j with "MenuItem = "TestException
       end
       when Word = "PUSHBUTTON_CLICK(Button)," then do
          parse value LongFileLine.j with "Button = "TestException
       end
       when Word = "PUSHBUTTON_CLICK("Done")," then do
          parse value LongFileLine.j with '("'TestException'")'
       end
       when Word = "PUSHBUTTON_CLICK("OK")," then do
          parse value LongFileLine.j with '(" 'TestException'")'
       end
       otherwise return 0
    end
    say TestException "difference"
    FileName = TrainingFile||'.k'
    rc = ReadFile()
    if rc = 0 then do
       say TestException "candidate"
       call lineOut TrainingFile||'.x', TestException, 1
       call lineOut TrainingFile||'.x'
       call random 1, Result.0, ShortSeed
       call CleanUpTrainingFiles
       return 0
    end
end
Seed = time('S')
call random 1, Result.0, Seed
call CleanUpTrainingFiles
return 0
CleanUpTrainingFiles:
'@del 'TrainingFile||'.t 2>null'
'@del 'TrainingFile||'.f 2>null'
return 0
CleanUpApplication: procedure expose ApplicationWindowName
j = 1
rc = 0
do while rc = 0
```

```
        rc = SELECT_WINDOW("*",1,j)
        if rc = 0 then do
            call QUERY_TITLE 'WhatWindowResult'
            if WhatWindowResult = ApplicationWindowName then leave
            WhatWindowResult = " "
        end
        j = j + 1
    end
    j = 1
    rc = 0
    do while rc = 0
        rc = SELECT_WINDOW("*",1,j)
        if rc = 0 then do
            call QUERY_TITLE 'WhatWindowResult'
            if WhatWindowResult = ApplicationWindowName then do
                call KEYBOARD "F4", "A"
                return 0
            end
        end
        j = j + 1
    end
    return 0
ReadFile:
    InputRecord = lineIn(FileName,1,1)
    if InputRecord = TestException then return 1
    do while lines(FileName) <> 0
        InputRecord = lineIn(FileName)
        if InputRecord = TestException then return 1
    end
    return 0
```

DETAILED DESCRIPTION OF ILLUSTRATIVE EMBODIMENT

With reference now to FIGS. 14A–14D there is illustrated a high-level logic flow chart which depicts a method for training an automated software test to seek out a particular known defect. For example, if during early development of a system, a particular defect has been identified, the method and apparatus of the present invention may be utilized to train a quasi-random automated software test to once again locate the particular known defect so that attempted corrections of that defect may be rapidly and efficiently tested.

As depicted, the process begins at block 1401 and thereafter passes to block 1402. Block 1402 depicts the specifying of the goal of the quasi-random automated software test as a goal which identifies a particular known defect. Thereafter, the process passes to block 1403. Block 1403 illustrates a determination of whether or not a rule has been specified which causes the automated software test to train to locate the known defect and if not, the process passes to block 1404 and terminates.

Still referring to block 1403, if a rule specifying the training of the automated software test for a particular defect does exist the process passes to block 1405. Block 1405 illustrates the clearing of the "trace" log. This log, as will be explained in greater detail herein, sets forth and specifies each action taken in the quasi-random process of the automated software test and the so-called "seed" which precipitated that action. Those skilled in the art will appreciate that a seed is a numerical value utilized to initiate a quasi-random process.

Next, the process passes to block 1406. Block 1406 illustrates the initiation of the software test in an effort to reach the specified goal, that is the identification of a particularly known defect. The process then passes to block 1408. Block 1408 depicts a determination of whether or not that goal has been reached and, until that goal has been reached or the system times out the process returns, in an iterative fashion to block 1406.

Still referring to block 1408, in the event the goal has been reached that is the known defect has been identified, the process passes to block 1409. Block 1409 illustrates the saving of the seed which precipitated the action which reached the goal and the trace of actions which eventually reached the goal are set forth within the trace log. The candidate count is set to the number of actions within the trace log and thus, the reaching of the goal as accomplished in this particular facet of the automated software test, can be recreated utilizing the seed which initiated the first action the trace log which specifies each subsequent action and the candidate count which enumerates the number of actions required to reach the specified goal.

Next, the process passes via connector 1410 to block 1411. Block 1411 once again illustrates the running of the automated software test in order to reach the specified goal a second time. Next, the process passes to block 1412. As above, block 1412 illustrates a determination of whether or not the specified goal has been reached and if not, and a time out has not occurred, the process returns in that iterative fashion to block 1411. Still referring to block 1412, in the event the goal has been reached, the process passes to block 1413. Block 1413 illustrates the saving of the seed which initiated this particular series of quasi-random actions and each action required to reach the goal is set forth within a second trace log. Further, the number of actions within this trace log are specified.

Next, the process passes to block 1414. Block 1414 depicts a determination of whether or not the number of actions required to reach the goal during this iteration is equal to the number of actions previously required to reach the specified goal and if so, the process passes to connector 1415 in a manner which will be described below.

Still referring to block 1414, if the number of actions required to achieve the goal on a subsequent quasi-random test of the system is not equal to the previous number of actions required to reach that goal, the process passes to block 1416. Block 1416 depicts a determination of whether or not the original count of actions is greater than the most recent count of actions required to reach the goal, and if not, the process passes to block 1417. Block 1417 depicts the setting of an exception at the first action within the new trace log which differs from the list of actions within the original trace log. The process then passes to connector 1418 in a manner which will be described below.

Still referring to block 1416, in the event the original count of actions within the first trace log exceeds the count of action within the subsequent trace log, the process passes to block 1419. Block 1419 depicts the logging of an exception where the first action within the new trace log differs from the candidate trace log and the process then passes to block 1420. Block 1420 depicts the setting of the candidate seed equal to the new seed, as the goal is reached in fewer action in the subsequent test, the candidate trace is reset to the new trace log and the candidate count is reset to the number of actions in the new trace log, indicating that the subsequent test reached the defined goal in a more efficient manner. Thereafter, the process passes to connector 1418.

The process next passes to block 1421. Block 1421 depicts the initiation of the quasi-random automated software test utilizing the candidate seed determined above. The process then passes to block 1422. Block 1422 illustrates a determination of whether or not the specified goal is reached and if not, as above, the process returns to block 1421 in an iterative fashion. Still referring to block 1422, if the goal is reached, the process passes to block 1423.

Block 1423 illustrates the saving of a new trace within the trace log and the identification of the count of actions required for the new trace. The process then passes to block 1424. Block 1424 depicts a determination of whether the candidate count of the number of actions required to reach the goal in this iteration and if so, the process passes to connector 1425 for further processing in a manner which will be described below.

Still referring to block 1424, in the event the candidate count is not equal to the count of actions within the new trace log, the process passes to block 1425. Block 1425 depicts a determination of whether or not the candidate count of actions is greater than the count of actions within the most recent trace log and if not, the process passes to block 1426, which logs an exception at the first action which is different from the new trace log. Thereafter, the process returns to block 1421 in an iterative fashion, to proceed as described above.

Still referring to block 1425, in the event the candidate count is greater than the new count for the most recent trace, the process passes to block 1427. Block 1427 depicts the saving of an exception noting the first different action from the candidate trace log and the process then passes to block 1428. Block 1428 illustrates the setting of the candidate trace equal to the new trace log and the candidate count equal to the number of actions in the new trace log indicating that the most recent achievement of the specified goal was more efficient. Thereafter, the process returns to block 1421, in an iterative fashion, to continue to search for the most efficient series of actions for reaching the specified goal.

Referring again to block 1424 and block 1414, in the event the candidate count of actions of following a particular goal achievement is equal to the new count of actions, indicating that the paths to the specified goal are identical goal in terms of number of actions, the process passes through connector 1415 to block 1429. Block 1429 illustrates a determination of whether or not the candidate trace log is identical to the new trace log, indicating that the goal was achieved by an identical series of actions. If not, the process passes via connector 1418, to block 1421 and repeats in an iterative fashion. Alternatively, in the event the candidate trace log is equal to the new trace log, indicating a convergence of the processes required to reach the specified goal, the process passes to block 1430 and terminates.

In the manner described above, those having ordinary skill in the art will appreciate that the Applicant has devised a method and a system whereby a quasi-random automated software test may be trained to automatically determine the most efficient method for achieving a specified goal such as a known defect, in order that the quasi-random automated software test may be thereafter utilized to determine whether or not a particular defect has been corrected without requiring the testing of all maimer of possible action combinations.

Figure 15:
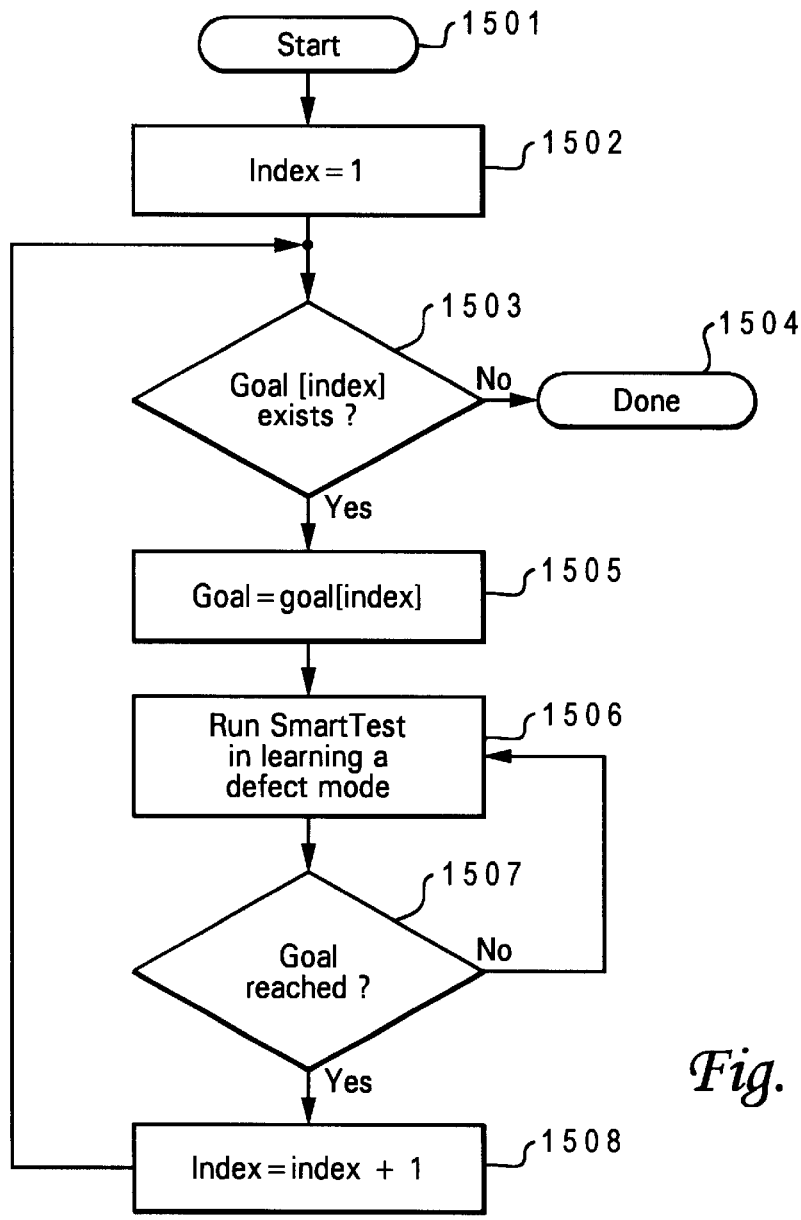
FIG. 15 is a high-level logic flow chart which illustrates a method for training an automated software test to perform a regression test.

Referring now to FIG. 15, there is depicted a high-level logic flow chart which illustrates a method for training an automated software test to perform a regression test. Those skilled in the art will appreciate that it is sometimes desirable to perform a regression test in which all possible outcomes of actions are determined. A quasi-random automated test may not achieve this result unless training is provided in a manner set forth herein.

As depicted, this process begins at block 1501 and thereafter passes to block 1502. Block 1502 depicts the setting of the index equal to "1" and the process then passes to block 1503. Block 1503 illustrates a determination of whether or not a goal having that index exists within the automated software test and if not, the process passes to block 1504 and terminates. Still referring to block 1503, in the event a goal with the specified index number exists, the process passes to block 1505. Block 1505 depicts the setting of the current goal to the goal with the specified index and the process then passes to block 1506. Block 1506 illustrates, in abbreviated form, the execution of the quasi-random automated software test of the present invention in a learning defect mode as described above with respect to FIGS. 14A–14D.

Next, the process passes to block 1507. Block 1507 depicts a determination of whether or not the goal has been achieved and if not, until a time out occurs, the process returns in an iterative fashion to block 1506. Still referring to block 1507, once the specified goal has been reached, the process passes to block 1508.

Block 1508 depicts the incrementing of the index number and the process then return to block 1503, in an iterative fashion to continue to cycle until each specified goal has been achieved.

In this manner, as those skilled in the art will appreciate, a quasi-random automated software test may be trained to execute a regression test in which all possible outcomes can be tested.

Figure 16A:
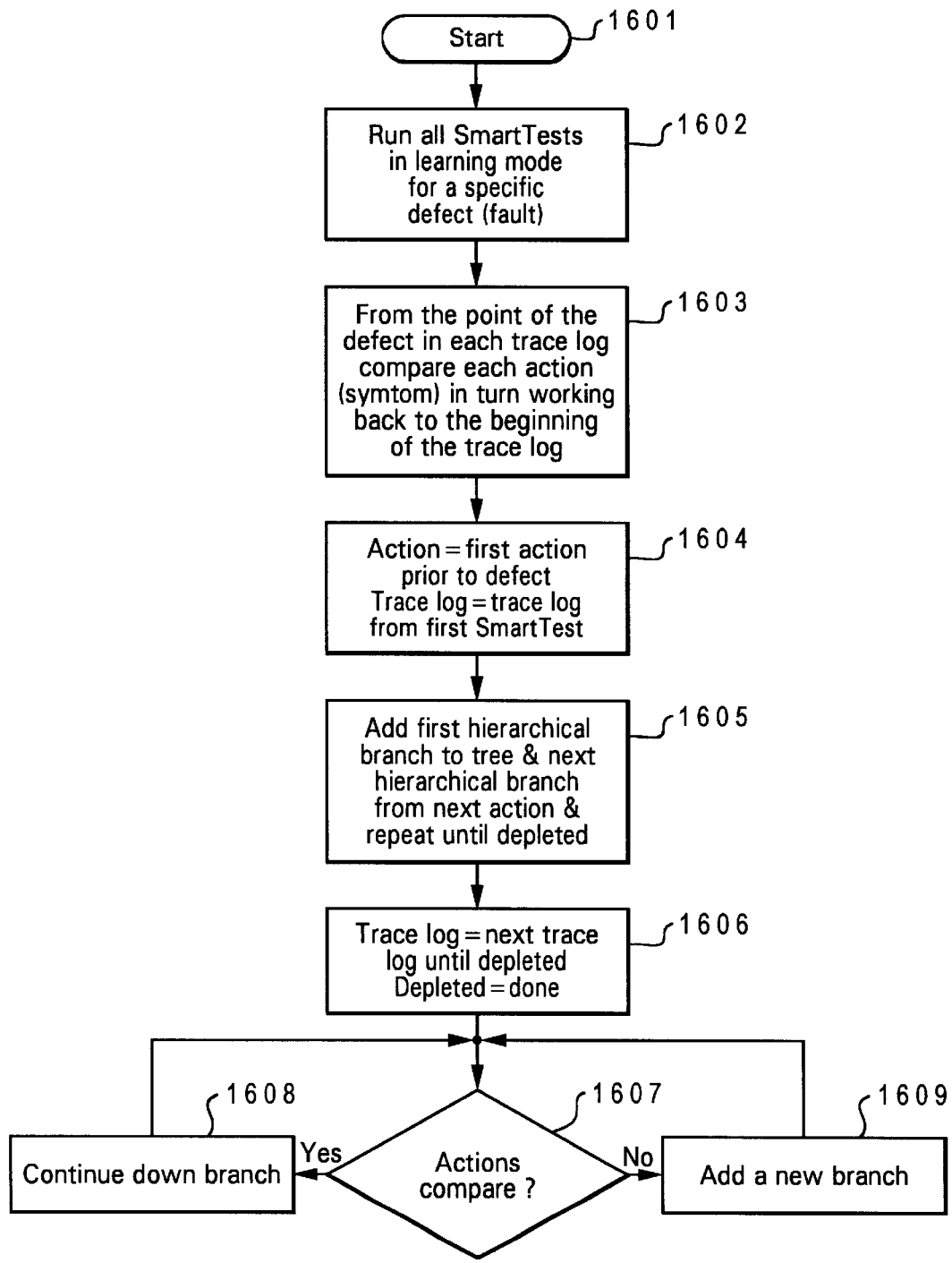
FIG. 16A is a high-level logic flow chart which illustrates a method for training an automated software test to create a probable cause tree for a known defect.

With reference now to FIG. 16A, there is depicted of how a high-level flow chart which illustrates a method of training an automated software test to create a probable cause tree for a known defect. As illustrated, the process begins to block 1601 and thereafter passes to block 1602. Block 1602 depicts, in abbreviated form, the execution of the quasi-random automated software test in a learning mode for a specific defect, as described above with respect to FIGS. 14A–14D. The process then passes to block 1603. Block 1603 depicts the beginning of the creation of a probable cause tree from the point of the achieved defect or fault in each trace log which terminated at that fault back to the initial action within the trace log. The process then passes to block 1604.

Block 1604 illustrates the saving of the first action prior to the achieving of the specified defect and the trace log which achieved that defect is saved. The process then passes to block 1605. Block 1605 illustrates the adding of a first hierarchial branch to a tree and a next hierarchial branch from the next action until each action within the trace log has been illustrated within a hierarchial tree.

Next, the process passes to block 1606. Block 1606 depicts the setting of the trace log equal to the next trace which achieved that trace log equal to the next trace which achieved that defect and each action within that trace log is added as a hierarchial branch to the probable cause tree, as described above. When each trace log has been illustrated this portion of the process terminates. Thereafter, the process passes to block 1607.

Block 1607 depicts a determination of whether or not the actions are identical and if so, the process passes to block 1608 which depicts the continuing down the hierarchial branch of those actions. Still referring to block 1607, in the event the actions differ the process passes to block 1609 which illustrates the adding of a new branch to the hierarchial tree in a manner which will be illustrated below.

Figure 16B:
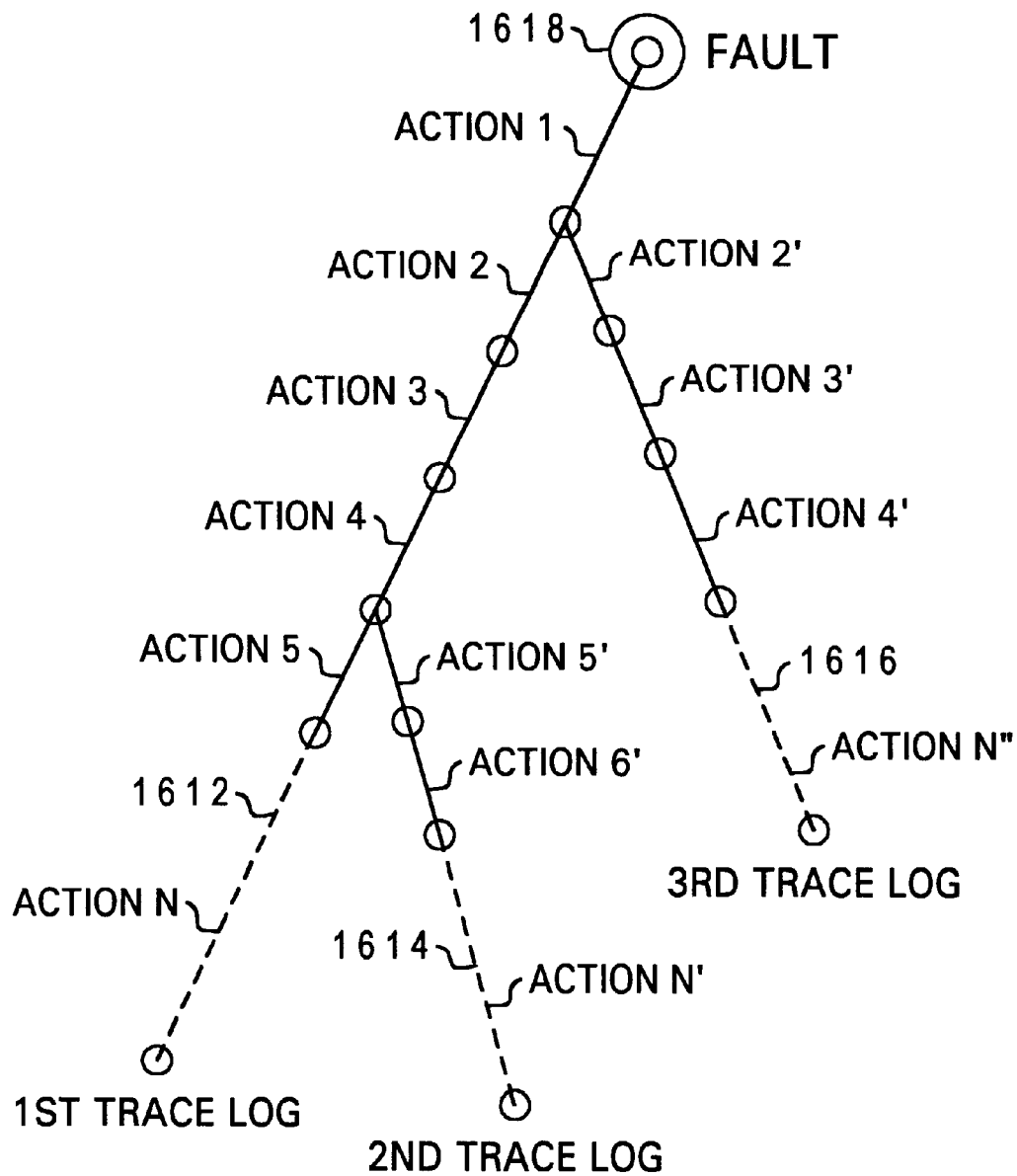
FIG. 16B is a pictorial illustration of a probable cause tree created utilizing the method of FIG. 16A.

Referring now to FIG. 16B, there is depicted a pictorial illustration of a probable cause tree created utilizing the method of FIG. 16A. As illustrated, a fault 1618 has been identified which was the termination event of three separate trace logs. Trace log 1612, trace log 1614 and trace log 1616 each terminated with fault 1618.

As depicted, trace log 1612 began with action N and each action thereafter which terminated at fault 1618 forms a segment of the branch leading first trace log to 1612 to fault 1618.

As depicted, second trace log 1614 began with action N' and thereafter multiple actions took place until such time as the remaining actions within second trace log 1614 were identical to first trace log 1612. Thus, actions for 3, 2 and 1 are present within first trace log 1612 and second trace log 1614. Similarly, third trace log 1616 depicts multiple actions which terminate at fault 1618 and, as illustrated, action 1 is common to first trace log 1612 and third trace log 1616.

In this manner, the probable cause tree created in accordance with the method of training depicted within FIG. 16A may be utilized to create a probable cause tree which may be utilized to trouble shoot the system under test.

Figure 17:
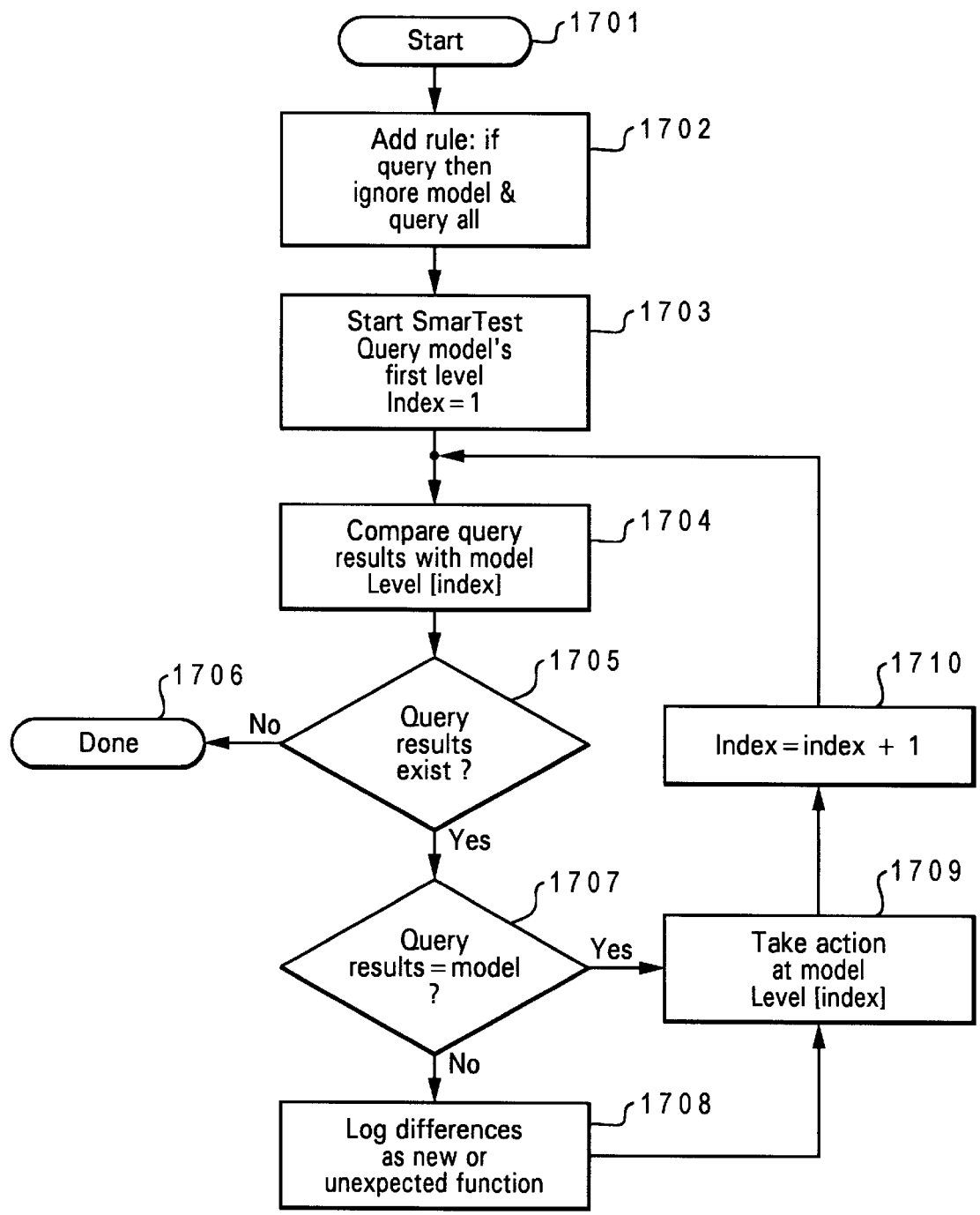
FIG. 17 depicts a high-level logic flow chart which illustrates a method for training an automated software test to detect new functions within a system under test.

Finally, referring to FIG. 17, there is depicted a high-level logic flow chart which illustrates a method for training an automated software test to detect new functions within a system under test. As illustrated, this process begins at block 1701 and thereafter passes to block 1702. Block 1702 illustrates the adding of a rule that for each query the model should be ignored and all elements queried.

Next, the process passes to block 1703. Block 1703 depicts the initiation of the quasi-random automated software test and the querying of the model of the system under test at a first level. An index is set equal to 1 and the process then passes to block 1704.

Block 1704 illustrates the comparison of the query results for the model level for the specified index and the process then passes to block 1705. In the event no query results exist, the process passes to block 1706 and terminates. However, in the event a query result does exist, the process passes to block 1707. Block 1707 illustrates a determination of whether the query results are as specified within the model and if so, the process passes to block 1709.

Block 1709 illustrates the taking of whatever action is specified at that model level index and thereafter, the process passes to block 1710. Block 1710 illustrates the incrementing of the index and the process then returns to block 1704 in an iterative fashion, to proceed as described above.

Still referring to block 1707, in the event the query results are not equal to the query results specified for the model, the process passes to block 1708. Block 1708 illustrates the logging of those differences of a new or unexpected function and the process then passes to block 1709 and proceeds as described above.

Those having ordinary skill in the art will, upon reference to this disclosure, appreciate that a quasi-random automated software test described herein may be trained in accordance with the method and apparatus of the present invention to locate and identify functions which are not specified within a model. For example, the automated software test may utilizing the process described herein, identify or locate buttons in a graphical user interface which are not specified within the system model and log those occurrences for the future use for the developer.

Although certain preferred embodiments have been shown and described, it will be understood that many changes and modifications may be made therein without departing from the scope and intent of the appended claims.

What is claimed is:

1. A method for training a quasi-random automated software test which operates in accordance with a specified model of a system to be tested, specified facts regarding the system to be tested, and specified rules under which the quasi-random automated software test will operate, said method comprising the steps of:

specifying as a goal of said quasi-random automated software test a particular defect to be identified;

initiating said quasi-random automated software test;

logging a trace of an initial seed and a number of actions required to reach said specified goal each time said specified goal is reached; and selecting from said log an initial seed and a minimum number of actions required to reach said specified goal such that said specified goal is capable of being repeatedly reached in an efficient manner despite the quasi-random nature of the automated software test.

2. The method for training a quasi-random automated software test according to claim further including the step of:

specifying a plurality of goals for said quasi-random automated software test each goal identifying a different defect to be identified.

3. The method for training a quasi-random automated software test according to claim 1 further including the step of:

graphically depicting each trace which reaches said specified goal in a probable cause tree such that actions common to multiple traces lie along a single hierarchical branch of said probable cause tree.

4. A method for training a quasi-random automated software test which operates in accordance with a specified model of a system to be tested, specified facts regarding the system to be tested, and specified rules under which the quasi-random automated software test will operate, said method comprising the steps of:

specifying as a rule a query of all elements beyond those elements set forth within said specified model of said system to be tested; and logging an indication of each element identified beyond those elements set forth within said specified model of said system to be tested during operation of said quasi-random automated software test.

5. A method for training a quasi-random automated software test according to claim 4 further including the step of:

logging an indication of each element identified beyond those elements set forth within said specified model of said system to be tested for each level of said specified model.

6. An apparatus for training a quasi-random automated software test which operates in accordance with a specified model of a system to be tested, specified facts regarding the system to be tested, and specified rules under which the quasi-random automated software test will operate, said apparatus comprising:

means for specifying as a goal of said quasi-random automated software test a particular defect to be identified;

means for initiating said quasi-random automated software test;

means for logging a trace of an initial seed and a number of actions required to reach said specified goal each time said specified goal is reached; and means for selecting from said log an initial seed and a minimum number of actions required to reach said specified goal such that said specified goal is capable of being repeatedly reached in an efficient manner despite the quasi-random nature of the automated software test.

7. The apparatus for training a quasi-random automated software test according to claim 6 further including:

means for specifying a plurality of goals for said quasi-random automated software test each goal identifying a different defect to be identified.

8. The apparatus for training a quasi-random automated software test according to claim 1 further including:

means for graphically depicting each trace which reaches said specified goal in a probable cause tree such that actions common to multiple traces lie along a single hierarchical branch of said probable cause tree.

9. The apparatus for training a quasi-random automated software test which operates in accordance with a specified model of a system to be tested, specified facts regarding the system to be tested, and specified rules under which the quasi-random automated software test will operate, said apparatus comprising:

means for specifying as a rule a query of all elements beyond those elements set forth within said specified said model of said system to be tested; and means for logging an indication of each element identified beyond those elements set forth within said specified model of said system to be tested during operation of said quasi-random automated software test.

10. An apparatus for training a quasi-random automated software test according to claim 9 further comprising:

means for logging an indication of each element identified beyond those elements set forth within the specified model of the system to be tested for each level of said system to be tested.

11. A computer readable program having data structures included on a computer readable medium for training a quasi-random automated software test which operates in accordance with a specified model of a system to be tested, specified facts regarding the system to be tested, and, specified rules under which the quasi-random automated software test will operate, said computer readable program comprising:

instruction means for specifying as a goal of said quasi-random automated software test a particular defect to be identified;

instruction means for initiating said quasi-random automated software test;

instruction means for logging a trace of an initial seed and a number of actions required to reach said specified goal each time said specified goal is reached; and instruction means for selecting from said log an initial seed and a minimum number of actions required to reach said specified goal such that said specified goal is capable of being repeatedly reached in an efficient manner despite the quasi-random nature of the automated software test.

12. The computer readable program for training a quasi-random automated software test according to claim 11 further comprising:

instruction means for specifying a plurality of goals for said quasi-random automated software test each goal identifying a different defect to be identified.

13. The computer readable program for training a quasi-random automated software test according to claim 11 further comprising:

instruction means for graphically depicting each trace which reaches said specified goal in a probable cause tree such that actions common to multiple traces lie along a single hierarchical branch of said probable cause tree.

14. A computer readable program having data structures included on a computer readable medium for training a quasi-random automated software test which operates in accordance with a specified model of a system to be tested, specified facts regarding the system to be tested, and specified rules under which the quasi-random automated software test will operate, said computer readable program comprising:

instruction means for specifying as a rule a query of all elements beyond those elements se forth within said specified model of said system to be tested; and instruction means for logging an indication of each element identified beyond those elements set forth within said specified model of said system to be tested during operation of said quasi-random automated software test.

15. A computer readable program according to claim 14 further comprising:

instruction means for logging an indication of each element identified beyond those elements set forth within the specified model for each level of said specified model.

* * * * *